United States Patent
Goyal et al.

(10) Patent No.: US 10,990,819 B2
(45) Date of Patent: Apr. 27, 2021

(54) DETERMINING TRAFFIC CONTROL FEATURES BASED ON TELEMETRY PATTERNS WITHIN DIGITAL IMAGE REPRESENTATIONS OF VEHICLE TELEMETRY DATA

(71) Applicant: Lyft, Inc., San Francisco, CA (US)

(72) Inventors: Deeksha Goyal, Redlands, CA (US); Han Suk Kim, San Francisco, CA (US); James Kevin Murphy, San Francisco, CA (US); Albert Yuen, San Francisco, CA (US)

(73) Assignee: LYFT, INC., San Francisco, CA (US)

( * ) Notice: Subject to any disclaimer, the term of this patent is extended or adjusted under 35 U.S.C. 154(b) by 61 days.

(21) Appl. No.: 16/408,168

(22) Filed: May 9, 2019

(65) Prior Publication Data
US 2020/0356773 A1 Nov. 12, 2020

(51) Int. Cl.
*G06K 9/00* (2006.01)
*G06K 9/62* (2006.01)
*G06K 9/46* (2006.01)

(52) U.S. Cl.
CPC ....... *G06K 9/00624* (2013.01); *G06K 9/4642* (2013.01); *G06K 9/628* (2013.01); *G06K 9/6262* (2013.01)

(58) Field of Classification Search
CPC ............ G06K 9/00624; G06K 9/4642; G06K 9/6262; G06K 9/628
See application file for complete search history.

(56) References Cited

U.S. PATENT DOCUMENTS

| | | | |
|---|---|---|---|
| 10,210,751 B1* | 2/2019 | Eno | G08G 1/096827 |
| 2019/0063939 A1* | 2/2019 | Chai | G01C 21/3492 |
| 2020/0110416 A1* | 4/2020 | Hong | G06N 20/00 |

* cited by examiner

*Primary Examiner* — David F Dunphy
(74) *Attorney, Agent, or Firm* — Keller Jolley Preece

(57) ABSTRACT

The present disclosure relates to systems, methods, and non-transitory computer readable media for identifying traffic control features based on telemetry patterns within digital image representations of vehicle telemetry information. The disclosed systems can generate a digital image representation based on collected telemetry information to represent the frequency of different speed-location combinations for transportation vehicles passing through a traffic area. The disclosed systems can also apply a convolutional neural network to analyze the digital image representation and generate a predicted classification of a type of traffic control feature that corresponds to the digital image representation of vehicle telemetry information. The disclosed systems further train the convolutional neural network to determine traffic control features based on training data.

20 Claims, 13 Drawing Sheets

| Palo Alto Metrics | | | | | | | |
|---|---|---|---|---|---|---|---|
| Confidence Threshold | Coverage | Total Accuracy | Stop Sign Accuracy | Traffic Signal Accuracy | Neither accuracy | Average Precision | Average Recall | Average F-1 Score |
| 0% | 100% | 90.11% | 74.63% | 81.49% | 96.86% | 0.90 | 0.90 | 0.90 |
| 20% | 100% | 90.11% | 74.63% | 81.49% | 96.86% | 0.90 | 0.90 | 0.90 |
| 50% | 98.38% | 90.96% | 75.63% | 83.20% | 97.38% | 0.91 | 0.91 | 0.91 |
| 80% | 82.10% | 94.87% | 82.46% | 88.42% | 98.66% | 0.95 | 0.95 | 0.95 |
| 85% | 77.19% | 95.58% | 85.26% | 89.03% | 98.97% | 0.96 | 0.96 | 0.96 |
| 90% | 66.06% | 96.61% | 89.29% | 89.13% | 99.18% | 0.97 | 0.97 | 0.97 |
| 95% | 46.19% | 97.26% | 92.02% | 88.69% | 99.27% | 0.97 | 0.98 | 0.97 |
| 99% | 12.63% | 98.83% | 91.30% | 91.67% | 100% | 0.99 | 0.99 | 0.99 |

*Fig. 9*

DETERMINING TRAFFIC CONTROL FEATURES BASED ON TELEMETRY PATTERNS WITHIN DIGITAL IMAGE REPRESENTATIONS OF VEHICLE TELEMETRY DATA

BACKGROUND

Digital mapping processes lie at the core of daily operations for many on-demand transportation systems. Digital maps enable smooth coordination between provider devices and requester devices across computer networks, allow for generating and providing digital routes to provider devices, enable navigation of autonomous provider vehicles, and permit on-demand transportation systems to dispatch and position provider devices. For example, some conventional on-demand transportation systems can now utilize collective telemetry information from smartphones together with map information to provide intelligent route information including pickup locations, drop-off locations, delay indications, fastest routes, and estimated arrival times.

Despite these advances, conventional on-demand transportation systems continue to suffer from a number of disadvantages, particularly in their accuracy, efficiency, and flexibility. For example, conventional on-demand transportation systems are often inaccurate with regard to specific digital map features, such as traffic signs or traffic lights. For example, some conventional systems rely on satellite imagery to identify map features and corresponding traffic control elements. Such techniques, however, offer no street-level visibility and therefore fail to account for features that are difficult to discern (or that are occluded) from satellite view. For example, stop signs, traffic signals, speed bumps, and other traffic control elements are generally configured for street-level visibility, and are difficult to identify from satellite imagery. Accordingly, conventional systems often generate inaccurate digital maps that fail to account for these features and undermine coordination across provider devices and requester devices (e.g., provide inaccurate route information, navigation of autonomous vehicles, pick-up locations, arrival times, etc.). Furthermore, because conventional systems rely on infrequently captured satellite imagery, digital maps often reflect outdated information, which further undermines accuracy and reliability.

In addition, conventional on-demand transportation systems are inefficient. Particularly, many conventional systems are time-consuming and computationally expensive to operate. For example, some conventional systems utilize a fleet of mapping vehicles to collect and analyze road locations and street-level imagery to obtain digital mapping information. These systems are onerous and computationally expensive to operate, especially on a large scale for multiple geographic areas.

Further, conventional on-demand transportation systems are inflexible. For example, many conventional on-demand transportation systems cannot flexibly adapt to changes in detailed map features, such as traffic control elements. Indeed, as mentioned above, conventional systems often rely on satellite images or street-level images that are rigid and static (e.g., street-level images are sometimes captured after multiple months of lag time). Thus, these systems cannot properly account for sudden adjustments in traffic patterns over time. For example, conventional systems fail to dynamically identify newly-placed stop signs or temporary traffic control signals (e.g., as used for road construction). Furthermore, conventional systems are rigidly limited to areas where vehicle fleets and/or satellite imagery data are available.

These, along with additional problems and issues, exist with conventional on-demand transportation systems.

SUMMARY

One or more embodiments of the present disclosure provide benefits and/or solve one or more of the foregoing or other problems in the art with methods, systems, and non-transitory computer readable storage media that determine traffic control features utilizing a convolutional neural network (CNN) to classify digital image representations of vehicle telemetry data. In particular, the disclosed systems can determine traffic control features such as stop signs and stop lights by relying on large-scale vehicle telemetry information. For example, in some embodiments, the disclosed systems extract vehicle patterns from telemetry information at road ends (e.g., intersections) and utilize a convolutional neural network to label the extracted vehicle patterns. Particularly, the disclosed systems can generate a digital image representation of vehicle telemetry information (e.g., a histogram) and utilize a convolutional neural network to classify the digital image representation for a given traffic area as belonging to a traffic control feature class.

By utilizing a convolutional neural network and visual representation of traffic telemetry, the disclosed systems can accurately, efficiently, and flexibly determine traffic control features for traffic areas. To illustrate, experimenters have observed that the disclosed systems can achieve an accuracy of 96.6% with 66% coverage in detecting three classes of traffic control features, while having a confidence threshold of 90%. By determining traffic control features in this way, the disclosed systems can improve coordination across provide devices and requestor devices, routing predictions for transportation vehicles, transportation provider position predictions, safety of transportation vehicles, and navigation of autonomous vehicles.

The following description sets forth additional features and advantages of one or more embodiments of the disclosed methods, non-transitory computer-readable media, and systems. In some cases, such features and advantages are evident to a skilled artisan from the description or learned by the practice of the disclosed embodiments.

BRIEF DESCRIPTION OF THE DRAWINGS

The detailed description refers to the drawings briefly described below.

FIG. 9 illustrates a table of performance metrics associated with the traffic control feature determination system as applied to a different city than was monitored to collect training data for training a neural network in accordance with one or more embodiments;

DETAILED DESCRIPTION

Figure 1:
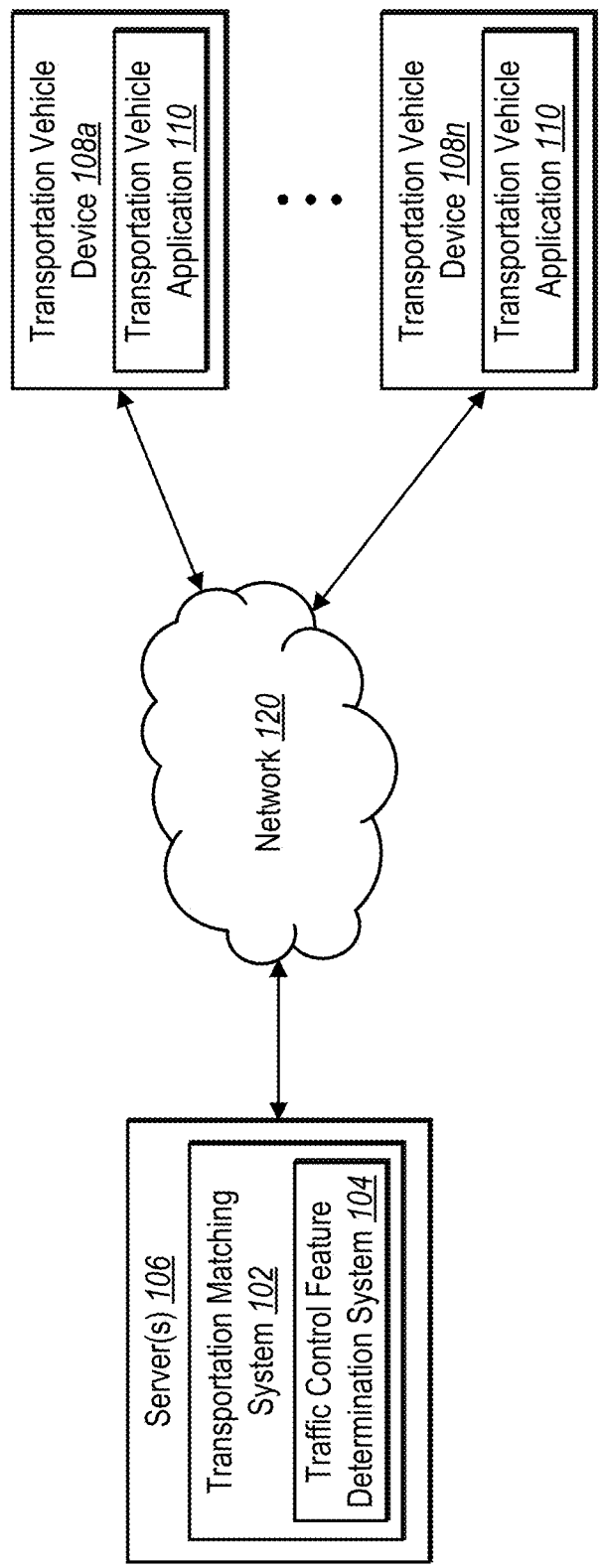
FIG. 1 illustrates a block diagram of an environment for implementing a traffic control feature determination system in accordance with one or more embodiments.

This disclosure describes one or more embodiments of a traffic control feature determination system that identifies traffic control features by utilizing a convolutional neural network to classify digital image representations of vehicle telemetry data. In particular, the traffic control feature determination system can gather telemetry information from transportation vehicles associated with a transportation matching system to determine map features, such as traffic control features with respect to one or more traffic areas. Given a set of telemetry data, the traffic control feature determination system can utilize histograms of the telemetry data with speed and distance from road ends to guide an inference of traffic control features for road segments. Specifically, in one or more embodiments, the traffic control feature determination system collects vehicle telemetry data for a traffic area (e.g., a road segment), generates a histogram of vehicle speed patterns for the traffic area, and provides the histogram to a CNN-powered computer vision model trained to recognize traffic control elements based on the pattern or signature of the histogram. In addition, the traffic control feature determination system can analyze the histogram to generate more accurate digital maps and traffic information, such as modeling actual driver behavior at a traffic control element or determining the length of delay for a traffic control element. In some embodiments, the traffic control feature determination system is implemented in real time to accurately, efficiently, and flexibly update digital maps as data is collected.

As mentioned, the traffic control feature determination system can identify vehicle telemetry information for various road segments. For example, in some embodiments the traffic control feature determination system monitors transportation vehicles by tracking GPS information associated with driver devices and requestor devices (consistent with driver and requestor privacy settings and permissions). To illustrate, the traffic control feature determination system can determine timestamps, speeds, latitudes, and/or longitudes of transportation vehicles that pass through a traffic area. In one or more embodiments, the traffic control feature determination system associates collected vehicle telemetry information with particular traffic areas. For instance, the traffic control feature determination system can collect telemetry information on an area-by-area (e.g., intersection-by-intersection) basis.

In addition to gathering vehicle telemetry information, the traffic control feature determination system can generate histograms of the vehicle telemetry information. For example, in some embodiments, the traffic control feature determination system analyzes the telemetry information to generate a histogram that reflects frequencies of transportation vehicles that exhibit particular combinations of speed and distance when passing through a traffic area. To illustrate, the traffic control feature determination system can generate a histogram that reflects speed on a first axis, location from an intersection on a second axis, and frequency of transportation vehicles on a third axis. In some embodiments, the traffic control feature determination system generates such histograms for a plurality of different traffic areas.

As mentioned, the traffic control feature determination system can generate digital image representations from histograms of telemetry information. For instance, in some embodiments, the traffic control feature determination system generates a digital image where a location of a pixel within the digital image corresponds to a particular speed and location combination (i.e., a "speed-location combination"). Moreover, a color of a pixel can reflect a frequency or number of monitored transportation vehicles that correspond to the particular speed-location combination. Thus, the traffic control feature determination system can generate digital image representations from histograms that reflect patterns or signatures of telemetry information for a particular road segment.

As mentioned, the traffic control feature determination system can utilize a neural network to determine traffic control features based on the digital image representations of vehicle telemetry data for individual traffic areas. In particular, in some embodiments the traffic control feature determination system utilizes a convolutional neural network trained to classify digital images to determine traffic control features. For example, the traffic control feature determination system can apply a convolutional neural network to a digital image that depicts vehicle telemetry information for an intersection and determine whether the intersection has a stop sign, a stop light, or some other traffic control feature. In some embodiments, the traffic control feature determination system can also apply a convolutional neural network to determine that no traffic control feature exists in a traffic area.

In addition to utilizing a convolutional neural network, the traffic control feature determination system can also train a convolutional neural network to classify traffic control features. For example, in some embodiments the traffic control feature determination system trains a convolutional neural network based on training digital image representations and ground truth traffic control features. Specifically, the traffic control feature determination system can utilize the convolutional neural network to generate predictions of traffic control features based on training digital image representations of telemetry information, compare the predictions with ground truth traffic control feature labels, and modify one or more weights of the convolutional neural network. In this manner, the traffic control feature determination system can iteratively train a convolutional neural network and improve prediction accuracy.

In some embodiments, the traffic control feature determination system can further generate training data for training a convolutional neural network. For example, in some embodiments the traffic control feature determination system identifies training vehicle telemetry information based on speeds and locations of transportation vehicles within training traffic areas. In some embodiments, the traffic control feature determination system generates bounding boxes around traffic areas to delineate geographic regions in which to gather telemetry information. Additionally, the traffic control feature determination system can generate training digital image representations of the training vehicle telemetry information for the training areas by generating pixels of a digital image based on frequencies at which various speed-location combinations occur.

As outlined above, the traffic control feature determination system provides several advantages and benefits over conventional on-demand transportation systems. For instance, the traffic control feature determination system can improve accuracy relative to conventional systems by utilizing telemetry information for individual transportation vehicles in combination with a neural network to identify accurate map features. In contrast to satellite imagery utilized by conventional systems, the traffic control feature determination system can utilize a convolutional neural network that learns significant patterns and signatures within a digital image representation of telemetry information to accurately identify traffic control features for digital maps. In addition, the transportation vehicles can monitor and collect telemetry data in real-time. Accordingly, in contrast to conventional systems, the transportation can determine up-to-date traffic control features associated with individual traffic areas over time.

In addition, the traffic control feature determination system can improve efficiency relative to conventional systems. For example, while some conventional on-demand transportation systems utilize a time-consuming and computationally expensive approach that involves capturing and analyzing numerous street-level digital images to identify road features, the traffic control feature determination system can reduce the time and computation power required to determine traffic control features by utilizing a convolutional neural network to classify digital image representations of vehicle telemetry information.

Furthermore, the traffic control feature determination system can improve flexibility of implementing computing systems relative to conventional systems. In particular, because the traffic control feature determination system can monitor and determine traffic control features based on real-time (or near real-time) transportation vehicle telemetry information, the traffic control feature determination system can flexibly adapt to changing circumstances. For example, the traffic control feature determination system can adapt to accurately predict traffic control features in circumstances where there is a new traffic control feature, a temporary traffic control feature, and/or where no traffic control feature is visible from a satellite view. In addition, the traffic control feature determination system is adaptable to different geographic areas. For instance, the traffic control feature determination system can accurately generate predictions for traffic control features in multiple different geographic areas (e.g., cities or rural areas).

As illustrated by the foregoing discussion, the present disclosure utilizes a variety of terms to describe features and advantages of the traffic control feature determination system. For reference, additional detail is now provided regarding the use and definition of these terms. For example, as used herein, the term "traffic area" refers to a geographic area corresponding to a road or passage (e.g., a road or passage that a transportation vehicle can navigate). In some embodiments, a traffic area can include a segment of one or more roads, such as an intersection, an area of a roadway with a crosswalk, or a portion of a road between two intersections. A traffic area can be designated by one or more perimeters (e.g., bounding boxes or bounding circles) relative to a portion of a road (e.g., a bounding box surrounding an intersection). In some embodiments, a traffic area includes multiple intersections and/or multiple road segments.

As mentioned, the traffic control feature determination system can collect vehicle telemetry information associated with various traffic areas. As used herein, the term "vehicle telemetry information" (or simply "telemetry information") refers to travel information gathered about a transport vehicle. Vehicle telemetry information can include one or more data points collected from a device associated with a driver of a transportation vehicle (i.e., a provider device), a passenger of a transportation vehicle (i.e., a requestor device), and/or the transportation vehicle itself as the transportation vehicle passes through a traffic area. For example, vehicle telemetry information can include, a time (e.g., a timestamp), a speed (or velocity), an acceleration, an accuracy, and/or a location (e.g., a latitude, longitude, altitude, and/or a distance to an intersection).

As used herein, the term "digital image representation" (or "digital image" or "image representation") refers to a digital item, symbol, picture, icon, or illustration. For example, the term digital image includes digital files with the following file extensions: JPG, TIFF, BMP, PNG, RAW, or PDF. As mentioned, the traffic control feature determination system can generate a digital image representation of vehicle telemetry data for a given traffic area. Accordingly, a digital image representation can include a digital image that reflects vehicle telemetry information in a visual form. For example, a digital image representation can depict locations (e.g., a distance), speeds, and frequencies of transportation vehicles passing through a traffic area. In some embodiments, a digital image representation can include a two-dimensional or three-dimensional visual representation of a histogram. Additional detail regarding digital image representations of telemetry information is provided below.

Relatedly, the term "telemetry pattern" refers to a relationship between visual elements of a digital image representation portraying vehicle telemetry information. For instance, a telemetry pattern can include a shape, an outline, an arrangement, a signature, or a correspondence between pixels in a digital image representation that reflects frequencies of different speed-location combinations. In some embodiments, a telemetry pattern can be depicted by pixels having different colors forming a shape within a digital image representation. For example, a telemetry pattern can be in the form of a v-shaped pattern or arrangement within a histogram of speed and location within a particular traffic area (e.g., indicating a stop sign).

As also mentioned, the traffic control feature determination system can utilize a neural network such as a convolutional neural network to analyze a digital image representation to determine a corresponding traffic control feature. As used herein, the term "traffic control feature" refers to a feature or element associated with a traffic area that controls movement of transportation vehicles. A traffic control feature can include a traffic sign (e.g., a stop sign or a yield sign), a traffic light (e.g., a stop light), a speed bump, a crosswalk, a number of lanes on a road, a traffic circle (i.e., a roundabout), a turn restriction, a speed restriction sign, a construction zone (e.g., a worker holding a slow and/or stop sign), a metal plate covering a hole, or a train track crossing. In some embodiments, a traffic control feature can be permanent, while in other embodiments a traffic control feature can be temporary. In these or other embodiments, a traffic control feature can be implied where, for instance, no physical stop sign exists on a road but where one is implied based on telemetry information (e.g., the construction examples given above).

In addition, the term "deep learning architecture" (or "neural network) refers to a machine learning model that can be tuned (e.g., trained) based on training input to approximate unknown functions. In particular, the term "deep learning architecture" can include a model of interconnected digital neurons that communicate and learn to approximate complex functions and generate outputs based on a plurality of inputs provided to the model. For instance, the term "deep learning architecture" includes convolutional neural networks (i.e., "CNNs") and fully convolutional neural networks (i.e., "FCNs"). In other words, a "deep learning architecture" is an algorithm that implements deep learning techniques, i.e., machine learning that utilizes a set of algorithms to attempt to model high-level abstractions in data.

Relatedly, the term "train" refers to utilizing information to tune or teach a neural network. The term "training" (when used as an adjective or descriptor, such as in "training data," "training vehicle telemetry information," or "training telemetry pattern") refers to information or data utilized to tune or teach the neural network.

As mentioned, the traffic control feature determination system can determine a travel time for a passenger riding in a transportation vehicle based on one or more traffic control features. As used herein, the term "travel time" refers to an amount or duration of time to travel to a destination. To determine a travel time, the traffic control feature determination system can apply one or more time penalties based on stop times associated with traffic control features of various traffic areas. The term "time penalty" refers to a duration of time added to a travel time. For example, the traffic control feature determination system can determine a travel time based on how long a transportation vehicle is determined or predicted to be delayed due to a particular traffic control feature. Relatedly, the term "stop time" refers to a duration of time that a transportation vehicle is stopped (or slowed) at a particular traffic control feature.

Additional detail will now be provided with reference to the figures. The description with respect to FIG. 1 provides an overview of the traffic control feature determination system. Thereafter, much of the disclosure describes components and processes of the traffic control feature determination system in further detail with reference to subsequent figures.

To illustrate, FIG. 1 includes a block diagram of an environment for implementing a traffic control feature determination system 104 in accordance with one or more embodiments. As shown in FIG. 1, the environment includes the server(s) 106 implementing the traffic control feature determination system 104 as part of a transportation matching system 102. The environment of FIG. 1 further includes transportation vehicle devices 108a-108n and a network 120. The server(s) 106 can include one or more computing devices to implement the traffic control feature determination system 104. Additional description regarding the illustrated computing devices (e.g., the server(s) 106 and the transportation vehicle devices 108a-108n) is provided with respect to FIG. 12 below.

As shown, the traffic control feature determination system 104 utilizes the network 120 to communicate with the transportation vehicle devices 108a-108n. For example, the traffic control feature determination system 104 communicates with the transportation vehicle devices 108a-108n via the network 120 to determine telemetry information for the transportation vehicle devices 108a-108n. In some embodiments, consistent with device privacy and security settings, the traffic control feature determination system 104 receives location coordinates (e.g., latitude and longitude) from the transportation vehicle devices 108a-108n in addition to speed information and time information.

The transportation vehicle devices 108a-108n illustrated in FIG. 1 can include provider devices (e.g., mobile devices associated with transportation providers affiliated with the transportation matching system 102), requester devices (e.g., mobile devices associated with requesters/passengers who request transportation from the transportation matching system 102), and/or other transportation vehicle devices (e.g., devices located within an autonomous transportation vehicle). As shown in FIG. 1, each of the transportation vehicle devices 108a-108n include a transportation vehicle application 110. In many embodiments, the transportation matching system 102 communicates with the transportation vehicle devices 108a-108n through the transportation vehicle application 110 to, for example, match a transportation request with a provider. Additionally, the transportation vehicle application 110 optionally includes computer-executable instructions that, when executed by the transportation vehicle devices 108a-108n, cause the transportation vehicle devices 108a-108n to perform certain functions. For instance, the transportation vehicle application 110 can cause the transportation vehicle devices 108a-108n to communicate with the traffic control feature determination system 104 to provide telemetry information.

Although FIG. 1 illustrates the environment having a particular number and arrangement of components associated with the traffic control feature determination system 104, in some embodiments the environment may include more or fewer components with varying configurations. For example, in some embodiments, the environment includes a database either stored on the server(s) 106 or elsewhere in the environment, linked via the network 120. The database can include training data such as training telemetry information, training digital image representations of telemetry information, and/or training traffic areas for training a convolutional neural network. Indeed, in some embodiments the server(s) 106 and/or the traffic control feature determination system 104 may house all or a portion of a convolutional neural network for determining traffic control features.

Figure 2:
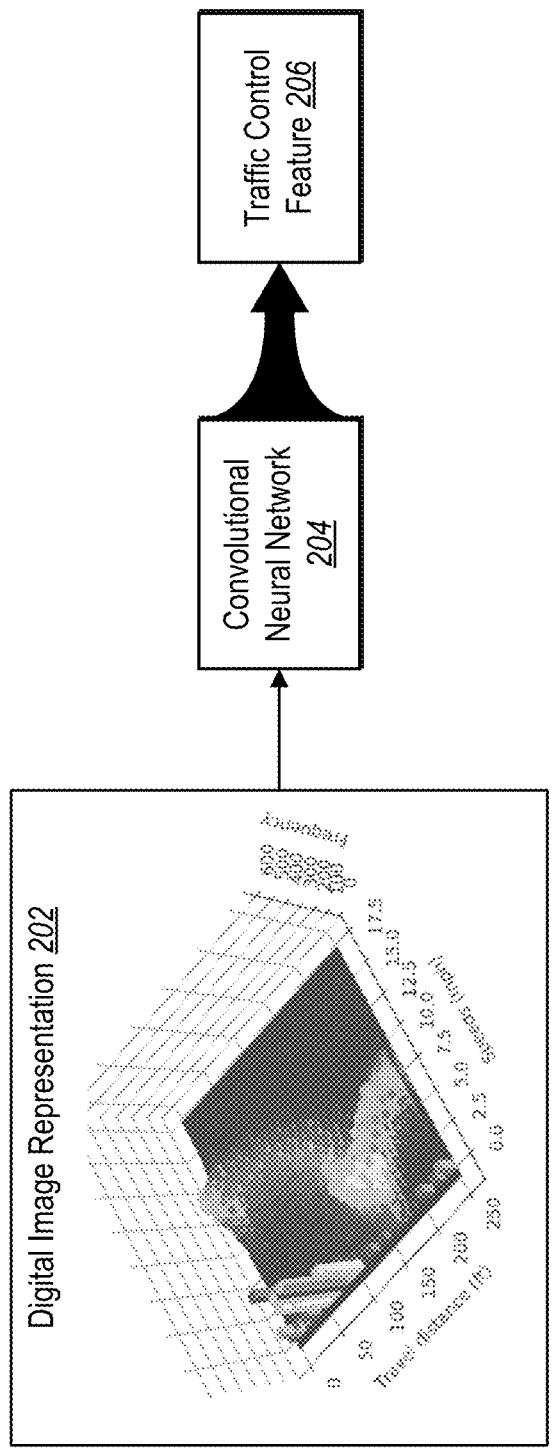
FIG. 2 illustrates a flow of determining a traffic control feature by utilizing a convolutional neural network based on a digital image representation of vehicle telemetry information in accordance with one or more embodiments.

As mentioned, the traffic control feature determination system 104 can utilize a digital image representation of vehicle telemetry information as input to a convolutional neural network to determine a corresponding traffic control feature. FIG. 2 illustrates generating a traffic control feature 206 in accordance with one or more embodiments. As shown, the traffic control feature determination system 104 utilizes a digital image representation 202 as input into a convolutional neural network 204 which generates or determines the traffic control feature 206.

To generate the traffic control feature 206, the traffic control feature determination system 104 utilizes the convolutional neural network 204 to analyze the pixels of the digital image representation 202. Based on the pattern or signature of vehicle telemetry information depicted by the digital image representation 202, the traffic control feature determination system 104 classifies the digital image representation 202 as belonging to one of a number of predefined labels, categories, or classifications of traffic control features (e.g., stop sign, stop light, etc.). In some embodiments, the traffic control feature determination system 104 utilizes a convolutional neural network 204 trained to classify the digital image representation 202 into one of three classes: traffic signal (i.e., stop light), stop sign, or neither. In other embodiments, the traffic control feature determination system 104 utilizes a convolutional neural network trained to classify the digital image representation 202 into one of a larger number of classes to account for additional traffic control features such as crosswalks, lanes, and/or speed bumps.

Given the digital image representation 202, the traffic control feature determination system 104 determines that the digital image representation 202 corresponds to or is associated with a traffic control feature 206 of a stop sign. To elaborate, the digital image representation 202 of FIG. 2 illustrates a particular pattern or signature of vehicle telemetry information that the convolutional neural network 204 classifies as corresponding to a stop sign. As shown, the digital image representation 202 depicts a curved v-shape telemetry pattern or signature of data points that indicate higher frequencies of transportation vehicles slowing to 0 or near-0 speeds near a distance of 175 feet within the given traffic area. The digital image representation 202 further illustrates some relatively high frequencies of speed-distance or speed-location combinations of a distance at or around 0 feet with speeds at or around 10-12 miles per hour. Given the v-shaped telemetry pattern within the digital image representation 202, where transportation vehicles slow to a stop or near stop around 175 feet and then begin to speed up again from 175 to 250 feet, the convolutional neural network 204 determines that the digital image representation 202 corresponds to a stop sign.

Although FIG. 2 illustrates a particular digital image representation 202 that reflects particular vehicle telemetry information with a particular telemetry pattern, the traffic control feature determination system 104 can also utilize the convolutional neural network 204 to analyze a digital image representation depicting different telemetry information to determine a different traffic control feature in turn.

In some embodiments, the traffic control feature determination system 104 determines a travel time associated with a transportation request with a route that passes through the travel area. To elaborate, the traffic control feature determination system 104 (as part of the transportation matching system 102) receives a transportation request from a requester and matches the request with a provider to service the request. The request can include request information such as a pickup location and a drop-off location. Based on determining a route for navigating from the pickup location to the drop-off location, the traffic control feature determination system 104 can further determine a travel time associated with navigating the route based on the traffic control feature 206. In some embodiments, the traffic control feature determination system 104 can also (or alternatively) determine a travel time for a provider to navigate to a pickup location to pick up the requester. In these or other embodiments, the traffic control feature determination system 104 provides a travel time and/or an arrival time of a provider to a pickup location and/or of a transportation vehicle transporting a requester to a destination.

To determine a travel time (or an arrival time), the traffic control feature determination system 104 determines a delay time (e.g., a stop time) associated with one or more traffic control features along a route (either from a current provider location to a pickup location or from a pickup location to a drop-off location). For example, the traffic control feature determination system 104 determines a stop time associated with the traffic control feature 206 by modeling transportation vehicle device behavior at the traffic control feature 206. More specifically, the traffic control feature determination system 104 determines, based on telemetry information such as timestamps, speeds, and locations, a duration of time (e.g., on average) that transportation vehicles spend stopped (or below a particular speed threshold) at the traffic control feature 206. In some embodiments, the traffic control feature determination system 104 determines a probability that a transportation vehicle is stopped at (or otherwise responding to) the traffic control feature 206 based on the digital image representation 202. In these or other embodiments, the traffic control feature determination system 104 determines a duration of time associated with the traffic control feature 206 based on the digital image representation 202. In addition, the traffic control feature determination system 104 applies a time penalty to modify a travel time based on the stop time associated with the traffic control feature 206.

In some embodiments, the traffic control feature determination system 104 determines stop times associated with implied traffic control features where, for instance, traffic responds to circumstances other than a physical stop sign (or other traffic control feature). For example, the traffic control feature determination system 104 identifies, and determines stop times for, implied traffic control features where traffic stops (or slows) coming out of a parking garage where no physical stop sign exists but where transportation vehicles exhibit behavior (as indicated by telemetry information) similar to stop sign behavior. By determining stop times and applying corresponding time penalties, the traffic control feature determination system 104 determines accurate travel times (or arrival times) by accounting for traffic control features (actual or implied) along a route.

In these or other embodiments, the traffic control feature determination system 104 weighs traffic control features in determining travel times (or arrival times). For example, the traffic control feature determination system 104 utilizes the convolutional neural network 204 to generate predictions of traffic control features along a route, where each prediction is accompanied by a confidence score or probability. Based on the confidence score for each respective traffic control signal determined along a route, the traffic control feature determination system 104 applies a weight to a corresponding stop time, thereby modifying time penalties in accordance with the confidence scores. Thus, the traffic control feature determination system 104 generates accurate time predictions by accounting for probabilities of accurately predicting traffic control features.

In some embodiments, the traffic control feature determination system 104 further determines a location of the traffic control feature 206 represented by the digital image representation 202. For instance, the traffic control feature determination system 104 determines, based on the location information (e.g., latitude and longitude) and speed information of transportation vehicles passing through the traffic area (relative to a boundary or perimeter of the traffic area), a geographic location of the traffic control element. From FIG. 2, for example, the traffic control feature determination system 104 can determine that a stop sign exists at 150 feet from a center of the traffic area.

In some embodiments, in addition to generating the traffic control feature 206 based on the digital image representation 202, the traffic control feature determination system 104 also generates the digital image representation 202 itself. For example, to generate the digital image representation 202 for a particular traffic area, the traffic control feature determination system 104 collects and plots individual data points of vehicle telemetry information, representing different frequencies of speed-location (or speed-distance) combinations/pairs with different heights (z-axis values) and/or colors. Indeed, while FIG. 2 is black-and-white, the traffic control feature determination system 104 can represent varying frequencies of speed-location combinations with different shades and/or colors having different channel values (e.g., RGB values, HSV values, or some other channel values for a different color space).

Figure 3:
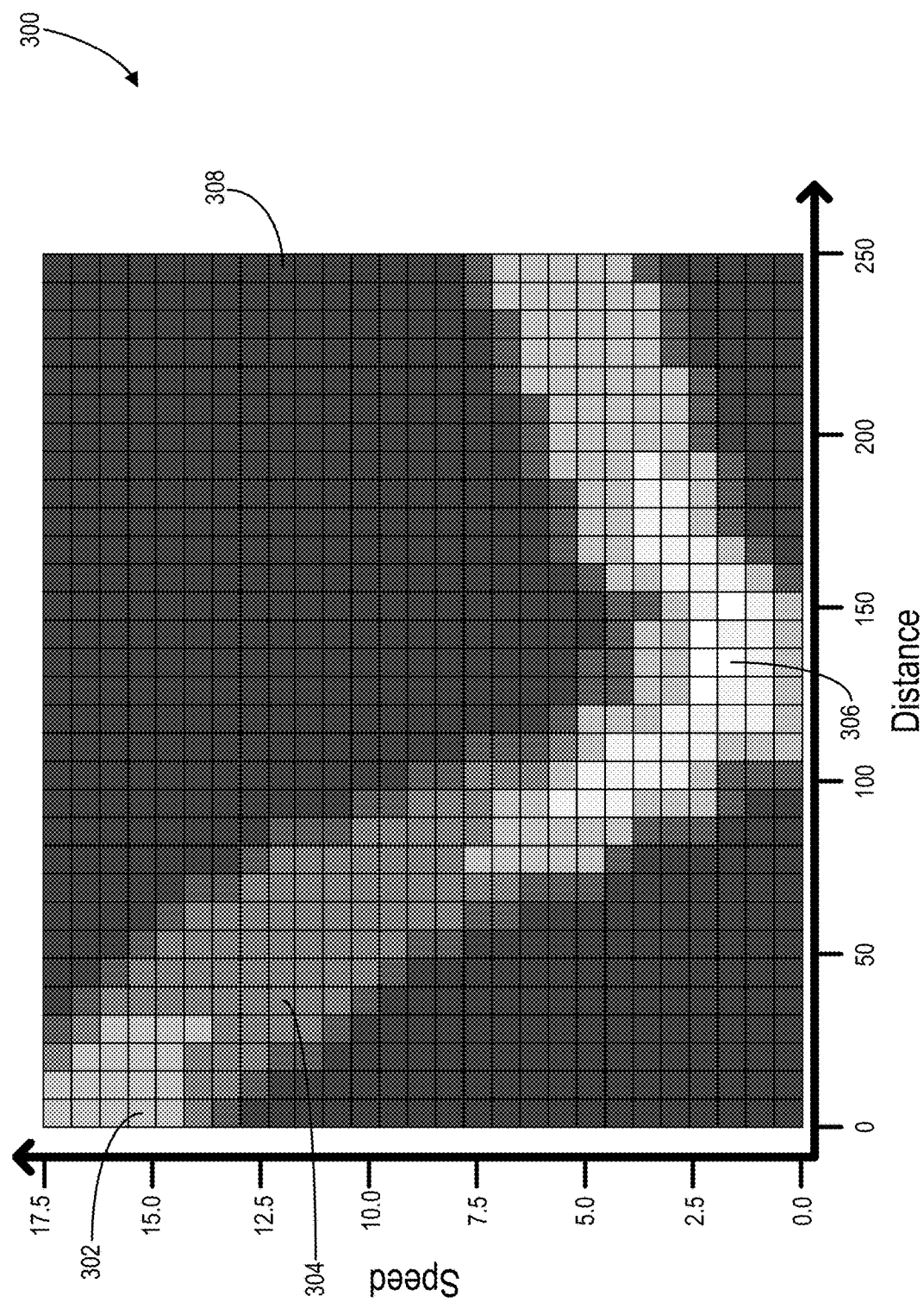
FIG. 3 illustrates a two-dimensional digital image representation of vehicle telemetry information in accordance with one or more embodiments.

Although FIG. 2 illustrates the digital image representation 202 as a three-dimensional histogram, in some embodiments the traffic control feature determination system 104 generates a two-dimensional histogram. Indeed, FIG. 3 illustrates a two-dimensional digital image representation 300 of vehicle telemetry information for a traffic area. The digital image representation 300 is a two-dimensional version of the digital image representation 202 shown in FIG. 2, although the individual pixel values have been approximated and simplified for clarity and discussion purposes.

As mentioned, the traffic control feature determination system 104 generates different shades and/or colors of pixels or groups of pixels to represent frequencies at which speed-location combinations occur. For example, in embodiments where the traffic control feature determination system 104 generates black-and-white digital image representations, the traffic control feature determination system 104 utilizes different grayscale shades to differentiate between frequencies of speed-location combinations. In embodiments where the traffic control feature determination system 104 utilizes color digital image representations, on the other hand, the traffic control feature determination system 104 utilizes different RGB (or other color space) values to differentiate between frequencies of speed-location combinations.

As illustrated in FIG. 3, the traffic control feature determination system 104 generates pixels (or pixel groups) 302-308 at different speed-distance coordinates within the digital image representation 300. As shown, the traffic control feature determination system 104 generates the pixel 302 having a first color, the pixel 304 having a second color, the pixel 306 having a third color, and the pixel 308 having a fourth color. To elaborate, the traffic control feature determination system 104 generates the pixel 302 having a first color indicating a particular frequency of data points or occurrences of transportation vehicles exhibiting speeds of around 16 miles per hour at a distance of around 15 feet. Thus, the traffic control feature determination system 104 determines pixel positions or locations within the digital image representation 300 that correspond to particular frequencies of speed-location combinations.

Additionally, the traffic control feature determination system 104 determines a second color for the pixel 304, different from the first color, to represent a lower frequency (relative to the frequency of the pixel 302) of speed-distance combinations at 12 miles per hour and 30 feet. Further, the traffic control feature determination system 104 generates a third color for the pixel 306 to indicate a higher frequency (relative to both the pixel 302 and the pixel 304) of speed-distance combinations at the respective coordinate location within the digital image representation 300 (e.g., a speed of 2 miles per hour at a distance of 140 feet). In addition, the traffic control feature determination system 104 generates a fourth color for the pixel 308 to indicate a lower frequency (relative to the pixels 302-306) of speed-distance combinations at the corresponding location within the digital image representation 300. The traffic control feature determination system 104 likewise generates color values for other pixels within the digital image representation 300 to represent vehicle telemetry information.

In addition to generating a digital image representation, the traffic control feature determination system 104 further determines a traffic control feature that corresponds to the digital image representation. To determine a traffic control feature (e.g., the traffic control feature 206) from a digital image representation (e.g., the digital image representation 202 or 300), the traffic control feature determination system 104 utilizes a convolutional neural network (e.g., the convolutional neural network 204) to classify the digital image representation based on color values of pixels at respective coordinate locations. For instance, the traffic control feature determination system 104 applies the convolutional neural network 204 to analyze the digital image representation 300 and, based on the weights associated with the internal layers and neurons of the convolutional neural network 204, determine that the signature of pixel colors shown in the digital image representation 300 corresponds to a stop sign.

Figure 4:
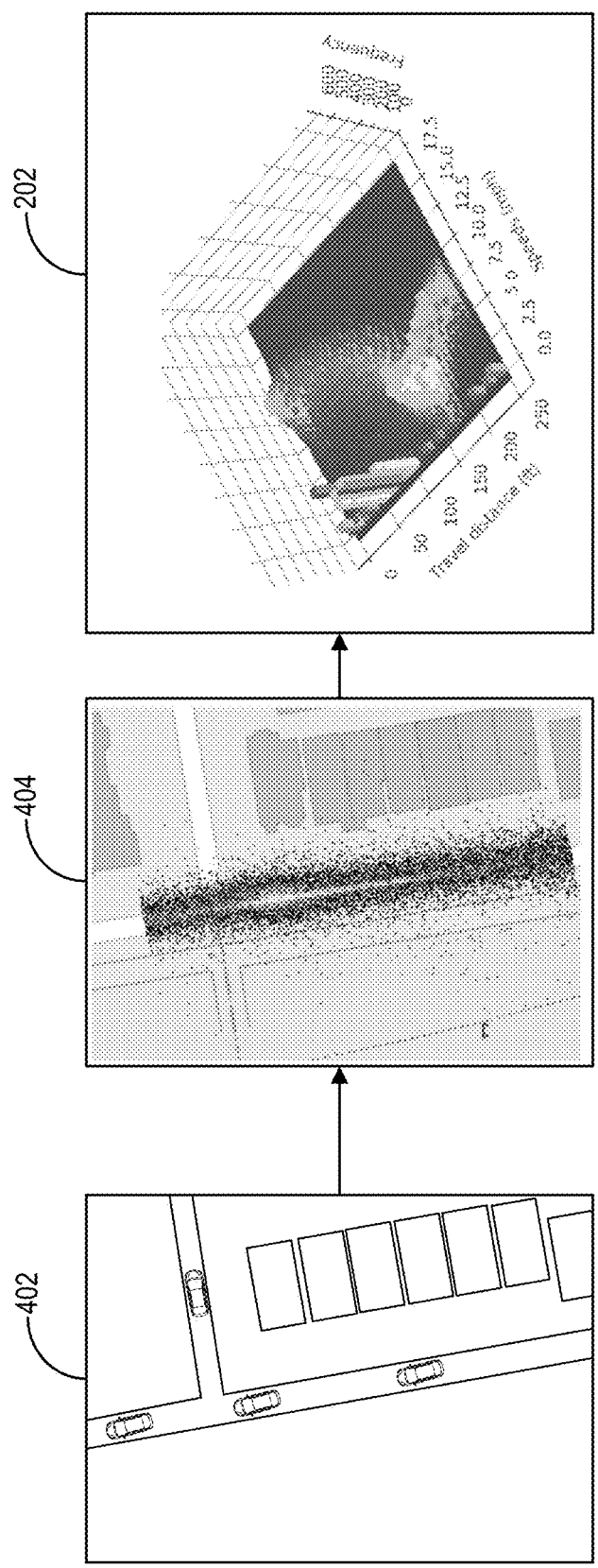
FIG. 4 illustrates generating a digital image representation that corresponds to a classification of a traffic sign in accordance with one or more embodiments.
Figure 5:
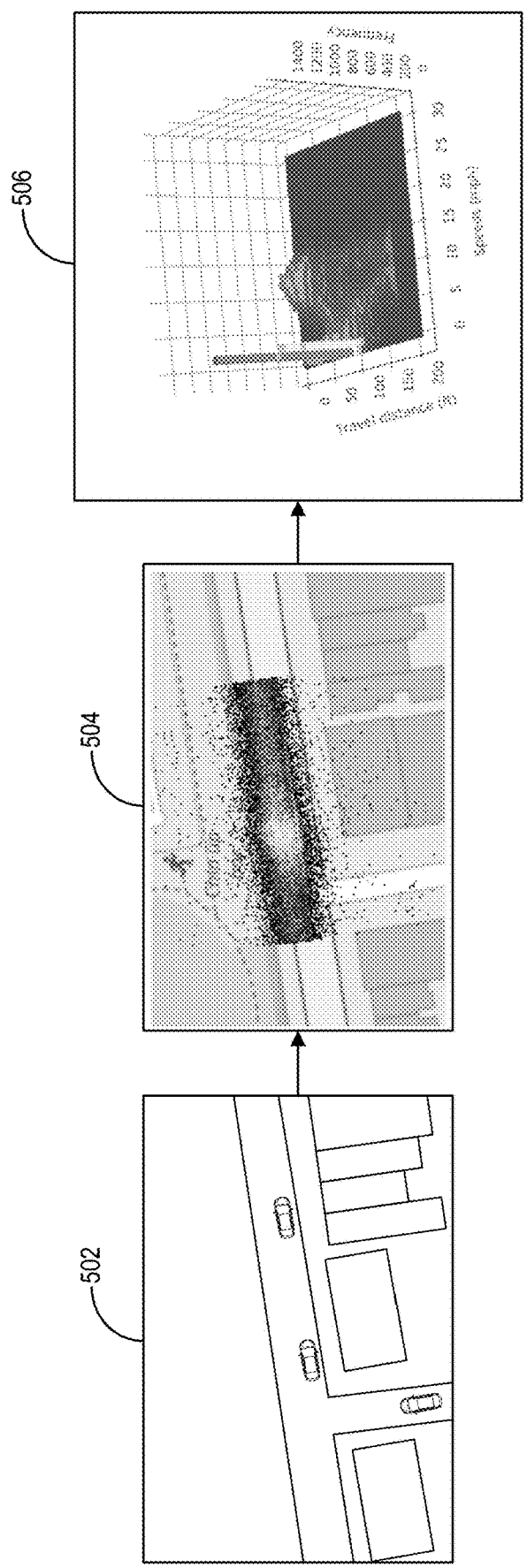
FIG. 5 illustrates generating a digital image representation that corresponds to a classification of a traffic light in accordance with one or more embodiments.
Figure 6:
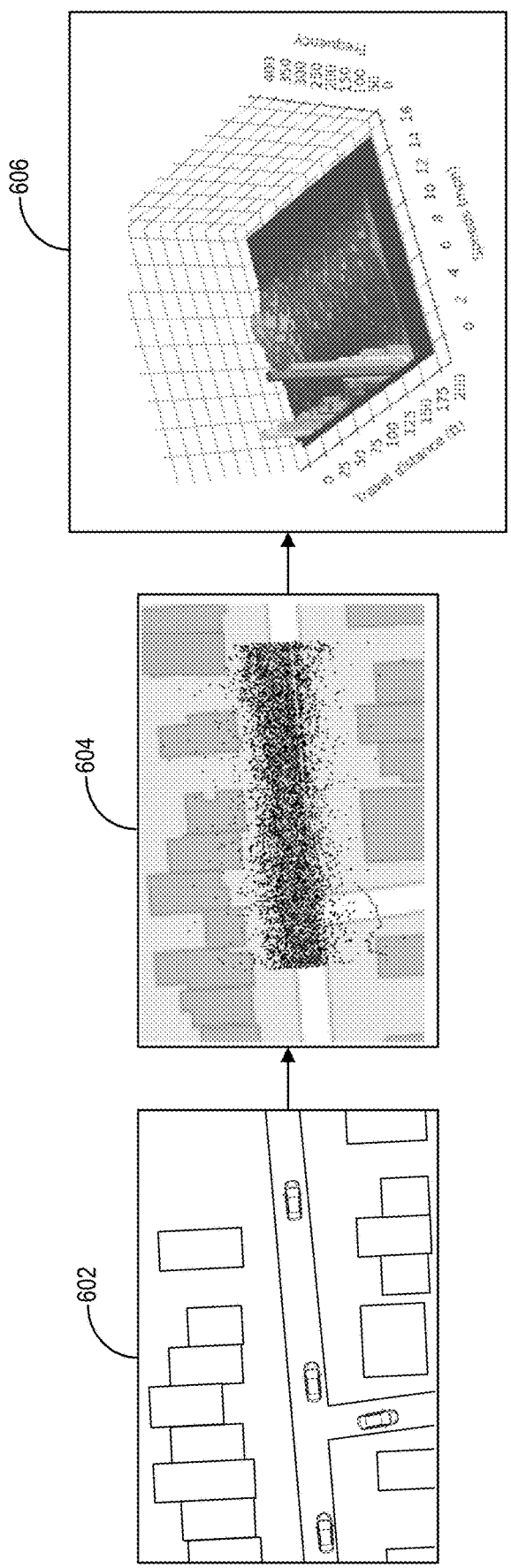
FIG. 6 illustrates an generating a digital image representation that corresponds to a classification of neither a traffic sign nor a traffic light in accordance with one or more embodiments.

As mentioned, the traffic control feature determination system 104 can generate digital image representations based on vehicle telemetry information. Indeed, FIGS. 4-6 illustrate three example digital image representations that the traffic control feature determination system 104 generates for individual traffic areas. In relation to FIG. 4, the traffic control feature determination system 104 generates a digital image representation 202 corresponding to a stop sign. In relation to FIG. 5, the traffic control feature determination system 104 generates a digital image representation 506 corresponding to a stop light. In relation to FIG. 6 the traffic control feature determination system 104 generates a digital image representation 606 that does not correspond to a stop sign or a stop light.

As illustrated in FIG. 4, the traffic control feature determination system 104 monitors telemetry information for a traffic area 402 that is shown with a top-down map view of two streets converging at an intersection. The traffic control feature determination system 104 gathers telemetry information for the traffic area 402 over a period of time. In particular, consistent with the privacy and security preferences/requirements of individuals, devices, and jurisdictions, the traffic control feature determination system monitors device information (e.g., from one or more of the transportation vehicle devices 108a-108n) such as GPS information, gyroscope information, time information, and/or inertial measurement unit ("IMU") information associated with the various transportation vehicle devices that pass through the traffic area 402. As a result of collecting vehicle telemetry information, the traffic control feature determination system 104 generates a data point representation 404 of the telemetry information illustrating different speeds, locations, and/or times of each data point. From the data point representation 404, the traffic control feature determination system 104 further generates the digital image representation 202 in the form of a histogram that reflects the data points in a graphical form that depicts a particular signature—in this case, a curved "v" shape. The signature of a curved "v" shape generally indicates a stop sign because, looking from left to right, the data points collectively show a pattern of transportation vehicle devices slowing to a stop (or near stop) at or near a common location (e.g., at the point of the "v") and then accelerating from that stop location. Thus, by applying a convolutional neural network (e.g., the convolutional neural network 204), the traffic control feature determination system 104 classifies the digital image representation 202 as a stop sign. In some embodiments, however, the traffic control feature determination system 104 generates the digital image representation 202 without generating the data point representation 404.

Similar to FIG. 4, FIG. 5 illustrates a process of generating a digital image representation 506. In particular, the traffic control feature determination system 104 monitors telemetry information for a traffic area 502. As mentioned, the traffic control feature determination system 104 gathers telemetry information for the traffic area 502 over a period of time by monitoring device information associated with various transportation vehicles that pass through the traffic area 502. In addition, the traffic control feature determination system 104 generates a data point representation 504 of the telemetry information illustrating different speeds, locations, and/or times of each collected data point. The traffic control feature determination system 104 further generates the digital image representation 506 in the form of a histogram that reflects the data points in a graphical form that depicts a particular signature. In some embodiments, the traffic control feature determination system 104 generates the digital image representation 506 without generating the data point representation 504.

As shown, the digital image representation 506 is different from the digital image representation 202. Therefore, the traffic control feature determination system 104 generates a prediction of a different classification (e.g., traffic control feature) based on the digital image representation 506. For example, the traffic control feature determination system 104 utilizes a convolutional neural network (e.g., the convolutional neural network 204) to determine that the digital image representation 506 corresponds to a stop light based on its depicted signature of telemetry information. Indeed, as shown in FIG. 5, the digital image representation 506 depicts some data points that resemble a "v" shape (indicating transportation vehicle devices that are slowing to a stop for a red light and then accelerating again) and other data points that continue in a relatively straight line across the indicated travel distance (corresponding to transportation vehicles that continue straight through the traffic area on a green light).

As illustrated in FIG. 6, the traffic control feature determination system 104 generates a digital image representation 606 that depicts a signature of telemetry information corresponding to a different classification than the digital image representation 202 and the digital image representation 506. To generate the digital image representation 606, the traffic control feature determination system 104 monitors telemetry information for a traffic area 602 that also shows two streets converging at an intersection. The traffic control feature determination system 104 gathers telemetry information for the traffic area 602 by monitoring device information associated with various transportation vehicles that pass through the traffic area 602. Additionally, the traffic control feature determination system 104 generates a data point representation 604 of the telemetry information illustrating different speeds, locations, times, and/or durations of each data point. Further, the traffic control feature determination system 104 further generates the digital image representation 606 in the form of a histogram that reflects the data points in a graphical form that depicts a particular signature of the telemetry information. In some embodiments, the traffic control feature determination system 104 generates the digital image representation 606 without generating the data point representation 604.

Additionally, the traffic control feature determination system 104 generates a prediction of a classification or label based on the digital image representation 606. For example, the traffic control feature determination system 104 utilizes a convolutional neural network (e.g., the convolutional neural network 204) to determine that the digital image representation 606 corresponds to neither a stop sign nor a stop light based on its depicted signature of telemetry information. Indeed, the digital image representation 606 depicts a signature of telemetry information including data points that do not form a "v" shape but instead form a relatively straight line across the travel distance of the traffic area. Based on this signature, the traffic control feature determination system 104 utilizes a convolutional neural network to determine that the digital image representation 606 corresponds to neither a stop sign nor a stop light.

Although FIGS. 4-6 illustrate example digital image representations 202, 506, and 606 corresponding to three particular classifications, in some embodiments the traffic control feature determination system 104 generates digital image representations for different classifications of traffic control features. For example, in some embodiments the traffic control feature determination system 104 generates digital image representations for speed bumps, yield signs, lanes, and/or crosswalks. Indeed, the traffic control feature determination system 104 generates digital image representations of traffic areas by monitoring telemetry information for transportation vehicles that pass through the traffic areas and by plotting histograms that reflect the telemetry data with distinct signatures classifiable by a convolutional neural network (e.g., the convolutional neural network 204).

As mentioned, the traffic control feature determination system 104 can also train a convolutional neural network (e.g., the convolutional neural network 204) to accurately generate predictions of traffic control features based on input digital image representations of vehicle telemetry information. Indeed, FIG. 7 illustrates an example process by which the traffic control feature determination system 104 trains a convolutional neural network 704 (e.g., the convolutional neural network 204) to determine traffic control features.

Figure 7:
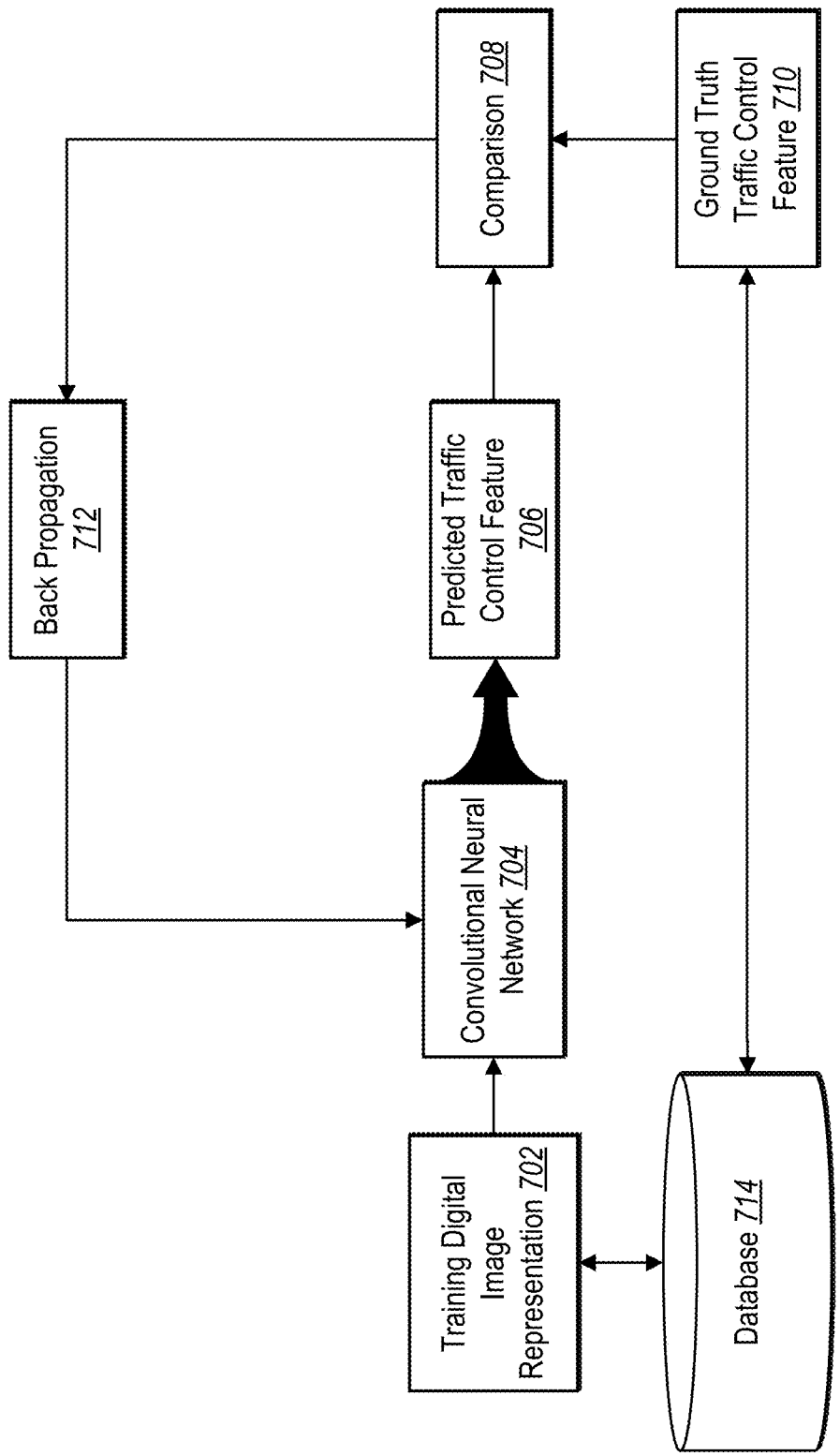
FIG. 7 illustrates training a convolutional neural network in accordance with one or more embodiments.

As illustrated in FIG. 7, the traffic control feature determination system 104 trains the convolutional neural network 704 based on training data including a training digital image representation 702 and a corresponding ground truth traffic control feature 710. Particularly, the traffic control feature determination system 104 accesses a database 714 to obtain or generate a training digital image representation 702. In some embodiments, the database 714 includes one or more sources of training data such as, for example, Open Street Map (OSM), San Francisco Open Data, and/or proprietary vehicle telemetry information (e.g., associated with the transportation matching system 102).

Indeed, in some embodiments, the traffic control feature determination system 104 accesses training vehicle telemetry information within the database 714 to generate the training digital image representation 702 for a particular traffic area based on the processes and methods described above. In other embodiments, the traffic control feature determination system 104 accesses a pre-generated training digital image representation 702 from the database 714 to utilize as training input for the convolutional neural network 704. In the above or other embodiments, the training digital image representation 702 is a kernel density estimator image that plots the frequency of data points found at certain speeds and distances (i.e., speed-distance combinations)

within a traffic area. For instance, a four-way intersection would have four different kernel density estimators for each direction of traffic flow into the intersection. In some embodiments, however, the traffic control feature determination system 104 generates a single kernel density estimator or a single digital image representation to represent an intersection, where the single kernel density estimator represents all traffic flows for the intersection.

Additionally, the traffic control feature determination system 104 inputs the training digital image representation 702 into the convolutional neural network 704. In some embodiments, the traffic control feature determination system 104 resizes the training digital image representation 702 before inputting into the convolutional neural network 704. For example, the traffic control feature determination system 104 resizes the training digital image representation 702 to dimensions of 224×224×3, and the traffic control feature determination system 104 further normalizes the three channels using a mean of [0.485, 0.485, 0.406] and a standard deviation of [0.229, 0.224, 0.225].

Based on its internal architecture of layers, weights, and neurons, the convolutional neural network 704 generates a predicted traffic control feature 706 based on the training digital image representation 702. For example, the convolutional neural network 704 can learn deep features via deep learning techniques to discern various transportation vehicle patterns from a corresponding kernel density estimator (e.g., the training digital image representation 702). To elaborate, in some embodiments the convolutional neural network 704 has a VGG19 architecture as described by Karen Simonyan and Andrew Zisserman in Very Deep Convolutional Networks for Large-Sale Image Recognition, CoRR abs/1409.1556, arXiv:1409.1556 (2014), which is incorporated by reference herein in its entirety. By utilizing this architecture, the convolutional neural network 704 has an effective receptive field with large filters, while also utilizing more non-linearities and relatively few parameters.

In some embodiments, the traffic control feature determination system 104 pre-trains the convolutional neural network 704 based on a digital image database. In particular, the traffic control feature determination system can 104 utilize a digital image database, such as ImageNet, before training based on training digital image representations of telemetry information (e.g., the training digital image representation 702). For example, the traffic control feature determination system 104 can train the convolutional neural network 704 to classify training objects portrayed in training digital images relative to ground truth objects for a first number of training iterations (e.g., for a first number of digital images). Thereafter, the traffic control feature determination system 104 can fine-tune the convolutional neural network 704 to classify traffic control features utilizing training digital image representations of histograms of telemetry information relative to ground truth traffic control features.

In addition, in some embodiments the traffic control feature determination system 104 initializes the weights of the convolutional neural network 704 pre-trained on ImageNet (and does not freeze any layers). In some embodiments, the traffic control feature determination system 104 further adds a new fully connected layer to the end of the convolutional neural network 704 to randomly initialize weights and output three scores (or a different number of scores depending on the number of classifications predicted for a given embodiment).

In some embodiments, however, the convolutional neural network 704 has a different architecture such as the ResNet architecture described by Kaiming He, Xiangyu Zhang, Shaoqing Ren, and Jian Sun in *Deep Residual Learning for Image Recognition*, IEEE Conference on Computer Vision and Pattern Recognition (2016), which is incorporated by reference herein in its entirety. In still other embodiments, the convolutional neural network 704 may utilize a custom architecture.

As illustrated in FIG. 7, the traffic control feature determination system 104 further performs a comparison 708 to compare the predicted traffic control feature 706 with a ground truth traffic control feature 710. Indeed, the traffic control feature determination system 104 accesses the ground truth traffic control feature 710 from the database 714, where the ground truth traffic control 710 corresponds to the training digital image representation 702 and reflects an actual or ground truth stop sign, stop light, or other classification/label based on the signature of vehicle telemetry information depicted within the training digital image representation 702.

To perform the comparison 708, the traffic control feature determination system 104 utilizes one or more loss functions to determine an error or measure of loss associated with the convolutional neural network 704. In some embodiments, for example, the traffic control feature determination system 104 utilizes a cross entropy loss function represented by:

$$L(X) = -\log\left(\frac{e^{f_{y_i}}}{\Sigma_e f_j}\right)$$

where $f_j$ represents the output of the convolutional neural network 704 for a given classification/label j (i.e., the predicted traffic control feature 706), and where the correct or ground truth classification/label (i.e., the ground truth traffic control feature 710) is $y_i$.

In addition to performing the comparison 708, the traffic control feature determination system 104 further performs a back propagation 712. In particular, the traffic control feature determination system 104 performs the back propagation 712 by adjusting or modifying one or more internal weights or parameters associated with the convolutional neural network 704. For example, the traffic control feature determination system 104 modifies one or more weights to reduce an error or measure of loss (e.g., as determined via the comparison 708) associated with the convolutional neural network 704.

The traffic control feature determination system 104 can repeat the process illustrated in FIG. 7 for multiple epochs (e.g., multiple iterations or analyses of individual sets of training data such as training digital image representations). For example, the traffic control feature determination system 104 can repeat the training process by identifying different training digital image representations, inputting the training digital image representations into the convolutional neural network 704 to generate a predicted traffic control feature, comparing the predicted traffic control feature with a ground truth traffic control (corresponding to a respective training digital image representation) to determine a measure of loss, and modifying weights to reduce the measure of loss. Indeed, in some embodiments the traffic control feature determination system 104 repeats the training process until the error or measure of loss satisfies (e.g., is below) a particular threshold to indicate that the convolutional neural network 704 generates accurate predictions of traffic control features.

In these or other embodiments, the traffic control feature determination system 104 decreases the learning rate associated with the convolutional neural network 704 by a certain factor (gamma) after 14 epochs. The traffic control feature determination system 104 further utilizes the Adam adaptive learning update described by Diederick P. Kingma and Jimmy Ba in *Adam: A Method for Stochastic Optimization*, International Conference on Learning Representations (2015), which is incorporated by reference herein in its entirety, with $\beta_1=0.9$, $\beta_2=0.999$, and $\epsilon=1e-8$ with a batch size of 8.

Figure 8B:
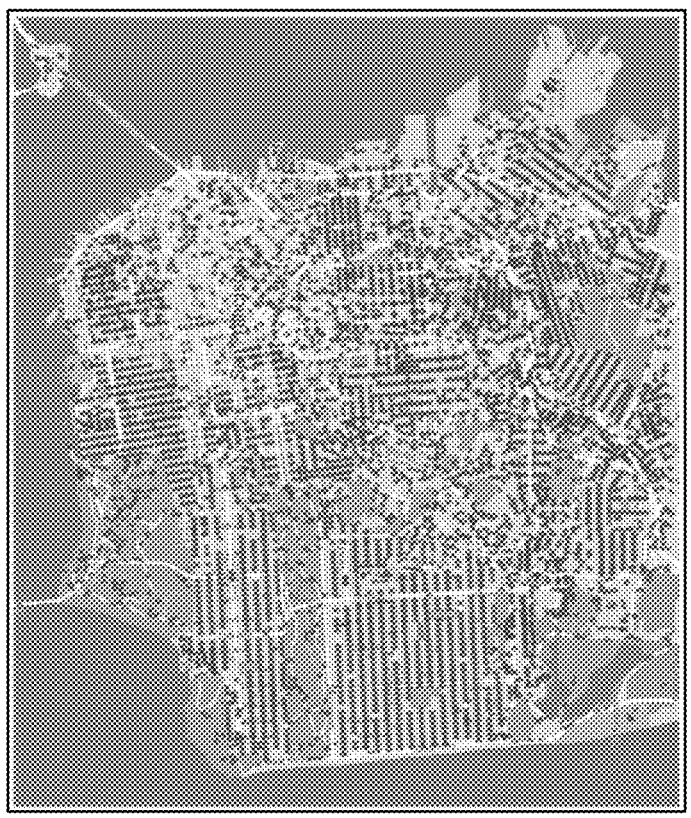
FIGS. 8A-8B illustrate bounding areas for collecting vehicle telemetry information in accordance with one or more embodiments.
Figure 8A:
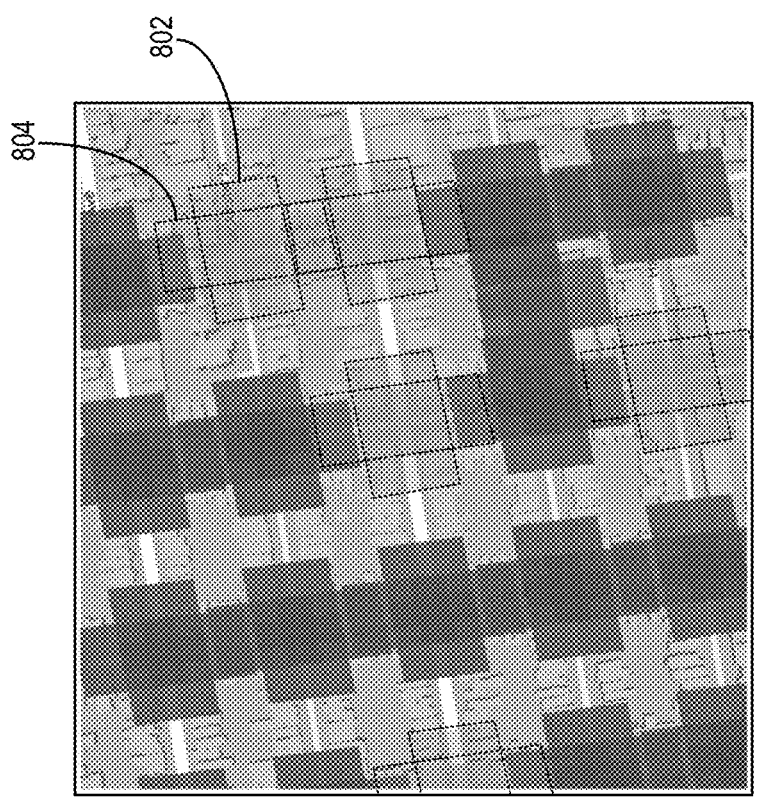

As mentioned, the traffic control feature determination system 104 trains the convolutional neural network 704 utilizing training data such as training digital image representations and ground truth traffic control features. FIGS. 8A and 8B illustrate example training data that the traffic control feature determination system 104 generates for training the convolutional neural network 704. As shown in FIG. 8A, the traffic control feature determination system 104 determines or identifies geographic areas from which to gather training telemetry information for respective traffic areas. For example, the traffic control feature determination system 104 delineates traffic areas such as intersections with bounding boxes (e.g., bounding boxes 802 and 804) to define areas in which to gather telemetry information.

As illustrated in FIG. 8A, the traffic control feature determination system 104 generates a separate bounding box for each direction of traffic flow through a traffic area. In particular, the traffic control feature determination system 104 generates a bounding box by taking each intersection within the OSM road network and creating a rectangle having certain dimensions (e.g., 57 meters long and 47 meters wide). In some embodiments, the traffic control feature determination system 104 generates bounding boxes to ensure that at least a threshold distance (e.g., 10 meters) is covered after an edge of the intersection, thereby providing adequate area for collecting telemetry information for entry into the traffic intersection (or other traffic area), crossing the intersection, and leaving the intersection. For example, as shown in FIG. 8A, the traffic control feature determination system 104 generates the bounding box 802 for a first direction of traffic through the corresponding traffic area, and the traffic control feature determination system 104 further generates the bounding box 804 for a second direction of traffic through the same traffic area.

Further, the traffic control feature determination system 104 can filter out bounding boxes for traffic areas that have more than a threshold number (e.g., four) of segments to avoid utilizing bounding boxes that cover multiple traffic flows. In addition, the traffic control feature determination system 104 can filter out bounding boxes for traffic areas that are within a threshold distance of each other (e.g., from center to center or from edge to edge) to avoid utilizing bounding boxes that cover more than one traffic area. By filtering out bounding boxes in this way, the traffic control feature determination system 104 reduces noisy information that might otherwise cause erroneous determinations due to the mixing of telemetry information from different traffic areas, which thereby improves the accuracy of predicting traffic control features. For the city of San Francisco, for example, the traffic control feature determination system 104 can generate a total of 33,532 bounding boxes after filtering out the above cases. In some embodiments, the traffic control feature determination system 104 utilizes 20% of the generated bounding boxes for testing, 20% for validation, and 60% for training, all or some of which are randomly selected for their respective purpose.

In relation to FIG. 8A, the traffic control feature determination system 104 further classifies or labels the bounding boxes using a traffic control database such as the San Francisco Open Data mentioned above. To determine labels for respective traffic areas, the traffic control feature determination system 104 determines which traffic control feature within the traffic control database are closest to a given traffic area (e.g., intersection) with a respective bounding box. If no traffic control element is within a threshold distance or within a bounding box, the traffic control feature determination system 104 labels the traffic area as containing no traffic control element (e.g., the neither classification in the three-classification embodiments described above).

In addition, the traffic control feature determination system 104 generates bounding boxes for different traffic control features. In some embodiments, the traffic control feature determination system 104 utilizes classifications of types of traffic control features. Although FIG. 8A illustrates bounding boxes, in some embodiments the traffic control feature determination system 104 generates bounding circles or some other shape of bounding area in accordance with the description herein. In these or other embodiments, the traffic control feature determination system 104 generates bounding shapes of different colors for different traffic control features.

For each of the bounding boxes of FIG. 8A, the traffic control feature determination system 104 collects vehicle telemetry information for transportation vehicles within the perimeter of the bounding boxes. In some embodiments, to generate training telemetry information, the traffic control feature determination system 104 collects trillions of data points from 40 days during the summer in San Francisco, where the days are chosen to be different days of the week to prevent overfitting for traffic patterns on certain days. The traffic control feature determination system 104 further places each of the data points within its respective bounding box.

Some data points may be placed in more than one bounding box because some bounding boxes overlap for different traffic flow directions through a single intersection or other traffic area. In some embodiments, the traffic control feature determination system 104 collects telemetry information from vehicles that satisfy a sensory accuracy threshold (e.g., a threshold signal strength from a transportation vehicle in a particular area or a threshold number or frequency of data points collected for the transportation vehicle in the area) to account for the fact that tall buildings in some places (e.g., San Francisco) can introduce error in readings for data points.

Additionally, to improve reliability in generating predictions, the traffic control feature determination system 104 can keep those bounding boxes that have at least a threshold number (e.g., 1000) of data points. As shown in FIG. 8B, and building on the above-mentioned scenario for San Francisco, the traffic control feature determination system 104 reduces the overall number of bounding boxes from 33,532 to 24,339 after dropping those that do not satisfy the threshold number of data points. In some embodiments, however, the traffic control feature determination system 104 need not drop bounding boxes but instead continues to collect telemetry information for each respective bounding box until the threshold number of data points is reached.

Further, to improve the accuracy of predictions, in some embodiments the traffic control feature determination system 104 keeps data points for transportation vehicles traveling into the traffic area (as opposed to leaving the traffic area). Thus, the traffic control feature determination system 104 prevents collecting vehicle telemetry information in the opposite direction of traffic flow for a given bounding box. In some embodiments, however, the traffic control feature determination system 104 collects telemetry information for any direction of traffic flow within a traffic area.

Additionally, the traffic control feature determination system 104 generates a digital image representation for a given bounding box. In some embodiments, the traffic control feature determination system 104 generates a digital image representation in the form of a kernel density estimator as described by B. W. Silverman in *Density Estimation for Statistics and Data Analysis*, Chapman & Hall, London (1986), which is incorporated herein by reference in its entirety. For example, the traffic control feature determination system 104 generates a kernel density estimator with a grid size of 1000 utilizing a Gaussian kernel function and determining the bandwidth using Silverman's rule of thumb (as described by B. W. Silverman in the above publication). At lower speeds, to avoid noisy data by collecting more location data points at lower speeds than at higher speeds due to the sampling rate, the traffic control feature determination system 104 normalizes the probability density function with a cube root and a min/max normalization. Such normalization further helps with surfacing signatures of telemetry information.

In some embodiments, the traffic control feature determination system 104 further utilizes hyperparameter tuning using the aforementioned kernel density estimators. For example, the traffic control feature determination system 104 sets a learning rate value and a gamma value to define a hyperparameter for controlling the learning process. In some embodiments, the traffic control feature determination system 104 sets the learning rate value at 0.001 and the gamma value at 0.1.

Experimenters have shown that the traffic control feature determination system 104 exhibits a high degree of accuracy. For example, experimenters utilized the traffic control feature determination system 104 to determine traffic control features for traffic areas (e.g., intersections) within the city of San Francisco. Utilizing a three-classification convolutional neural network, and after hyperparameter tuning, the traffic control feature determination system 104 exhibits a validation accuracy of over 84% after just 2.5 epochs, 88% after 5 epochs, and 91.26% after 17 epochs for the city of San Francisco. Similarly, the traffic control feature determination system 104 exhibits a training accuracy of over 84% after 2.5 epochs, around 87% after 5 epochs, and over 90% after 15 epochs.

In addition, the traffic control feature determination system 104 exhibits improved measures of loss over training epochs. For example, for San Francisco, the traffic control feature determination system 104 shows a validation loss of around 0.045 after 2.5 epochs, 0.040 after 7 epochs, and 0.035 after 17 epochs. Further the traffic control feature determination system 104 shows a training loss of around 0.060 after 2.5 epochs, 0.045 after 7 epochs, and less than 0.035 after 17 epochs.

Experimenters have further shown that the traffic control feature determination system 104 is highly flexible and exhibits transferability among geographic locations. For example, FIG. 9 illustrates the effectiveness of utilizing the traffic control feature determination system 104 in Palo Alto, where the convolutional neural network is trained on training data (e.g., telemetry information) from San Francisco. Even though Palo Alto has a much different layout of traffic areas when compared to San Francisco, the traffic control feature determination system 104 nevertheless exhibits a total accuracy of 90.1%. The table in FIG. 9 further illustrates accuracies of the traffic control feature determination system 104 with respect to three different classifications—stop signs, traffic signals (i.e., stop lights), and neither—with respect to different confidence thresholds. While FIG. 9 illustrates specific metrics for Palo Alto, this is merely illustrative, and the traffic control feature determination system 104 is further adaptable to other cities and geographic areas as well as for other traffic control features previously described.

Figure 10:
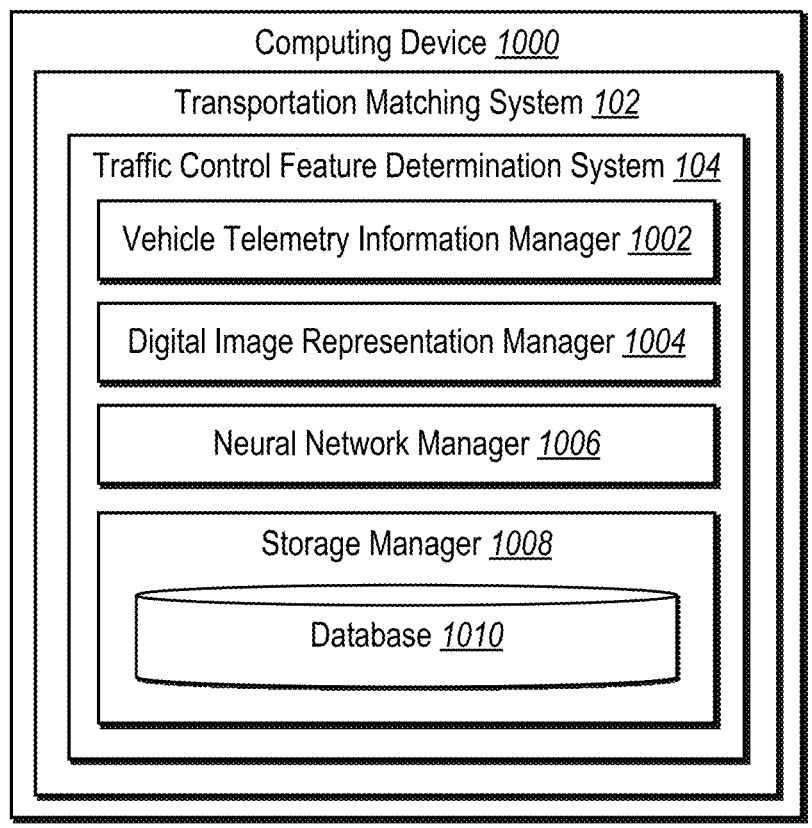
FIG. 10 illustrates a block diagram of a computing device including various components of a traffic control feature determination system in accordance with one or more embodiments.

Looking now to FIG. 10, additional detail will be provided regarding components and capabilities of the traffic control feature determination system 104. Specifically, FIG. 10 illustrates an example schematic diagram of the traffic control feature determination system 104 on an example computing device 1000 (e.g., one or more of the transportation vehicle devices 108a-108n and/or the server(s) 106). As shown in FIG. 10, the traffic control feature determination system 104 may include a vehicle telemetry information manager 1002, a digital image representation manager 1004, a neural network manager 1006, and a storage manager 1008.

As just mentioned, the traffic control feature determination system 104 includes a vehicle telemetry information manager 1002. In particular, the vehicle telemetry information manager 1002 manages, maintains, collects, gathers, obtains, accesses, monitors, and/or compiles vehicle telemetry information. For example, the vehicle telemetry information manager 1002 (consistent with individual, client device, and/or jurisdictional privacy and security requirements) collects vehicle telemetry information for transportation vehicles by communicating with transportation vehicle devices (e.g., driver and rider devices) to obtain information relating to acceleration, location (e.g., latitude and longitude), speed, accuracy, and/or time. The vehicle telemetry information manager 1002 collects vehicle telemetry information for transportation vehicles within traffic areas as delineated by the bounding boxes (or other bounding areas) described above. In addition, the vehicle telemetry information manager 1002 communicates with the storage manager 1008 to store vehicle telemetry information within the database 1010 (e.g., the database 714) for training a convolutional neural network and/or for determining traffic control features.

As shown, the traffic control feature determination system 104 includes a digital image representation manager 1004. In particular, the digital image representation manager 1004 manages, generates, creates, determines, identifies, and/or produces digital image representations vehicle telemetry information. For example, the digital image representation manager 1004 communicates with the vehicle telemetry information manager 1002 and/or the storage manager 1008 to access vehicle telemetry information and generates digital image representations of the vehicle telemetry information for individual traffic areas (or bounding boxes). In some embodiments, the digital image representation manager 1004 generates histograms and/or kernel density estimators as described above. Further, the digital image representation manager 1004 communicates with the storage manager 1008 to store digital image representations (e.g., a map of digital image representations for a particular geographic area) associated with particular traffic areas within the database 1010.

As mentioned, the traffic control feature determination system 104 further includes a neural network manager 1006. In particular, the neural network manager 1006 manages, maintains, trains, utilizes, implements, and/or applies a neural network (e.g., the convolutional neural network 204 or 704) to analyze a digital image representation of vehicle telemetry information to generate, identify, or determine a corresponding traffic control feature for a respective traffic area. For example, the neural network manager 1006 communicates with the digital image representation manager 1004 and/or the storage manager 1008 to access digital image representations to utilize as training data and/or input for determining traffic control features.

In one or more embodiments, each of the components of the traffic control feature determination system 104 are in communication with one another using any suitable communication technologies. Additionally, the components of the traffic control feature determination system 104 can be in communication with one or more other devices including one or more client devices (e.g., transportation vehicle devices 108a-108n) described above. It will be recognized that although the components of the traffic control feature determination system 104 are shown to be separate in FIG. 10, any of the subcomponents may be combined into fewer components, such as into a single component, or divided into more components as may serve a particular implementation. Furthermore, although the components of FIG. 10 are described in connection with the traffic control feature determination system 104, at least some of the components for performing operations in conjunction with the traffic control feature determination system 104 described herein may be implemented on other devices within the environment (e.g., one or more of the transportation vehicle devices 108a-108n).

The components of the traffic control feature determination system 104 can include software, hardware, or both. For example, the components of the traffic control feature determination system 104 can include one or more instructions stored on a computer-readable storage medium and executable by processors of one or more computing devices (e.g., the computing device 1000). When executed by the one or more processors, the computer-executable instructions of the traffic control feature determination system 104 can cause the computing device 1000 to perform the methods described herein. Alternatively, the components of the traffic control feature determination system 104 can comprise hardware, such as a special purpose processing device to perform a certain function or group of functions. Additionally or alternatively, the components of the traffic control feature determination system 104 can include a combination of computer-executable instructions and hardware.

Furthermore, the components of the traffic control feature determination system 104 performing the functions described herein may, for example, be implemented as part of a stand-alone application, as a module of an application, as a plug-in for applications including content management applications, as a library function or functions that may be called by other applications, and/or as a cloud-computing model. Thus, the components of the traffic control feature determination system 104 may be implemented as part of a stand-alone application on a personal computing device or a mobile device. Alternatively or additionally, the components of the traffic control feature determination system 104 may be implemented in any application that allows creation and delivery of marketing content to users, including, but not limited to, various applications.

FIGS. 1-10, the corresponding text, and the examples provide a number of different systems, methods, and non-transitory computer readable media for determining traffic control features based on a digital image representation of vehicle telemetry information using a convolutional neural network. In addition to the foregoing, embodiments can also be described in terms of flowcharts comprising acts for accomplishing a particular result. For example, FIG. 11 illustrates a flowchart of an example sequence of acts in accordance with one or more embodiments.

Figure 11:
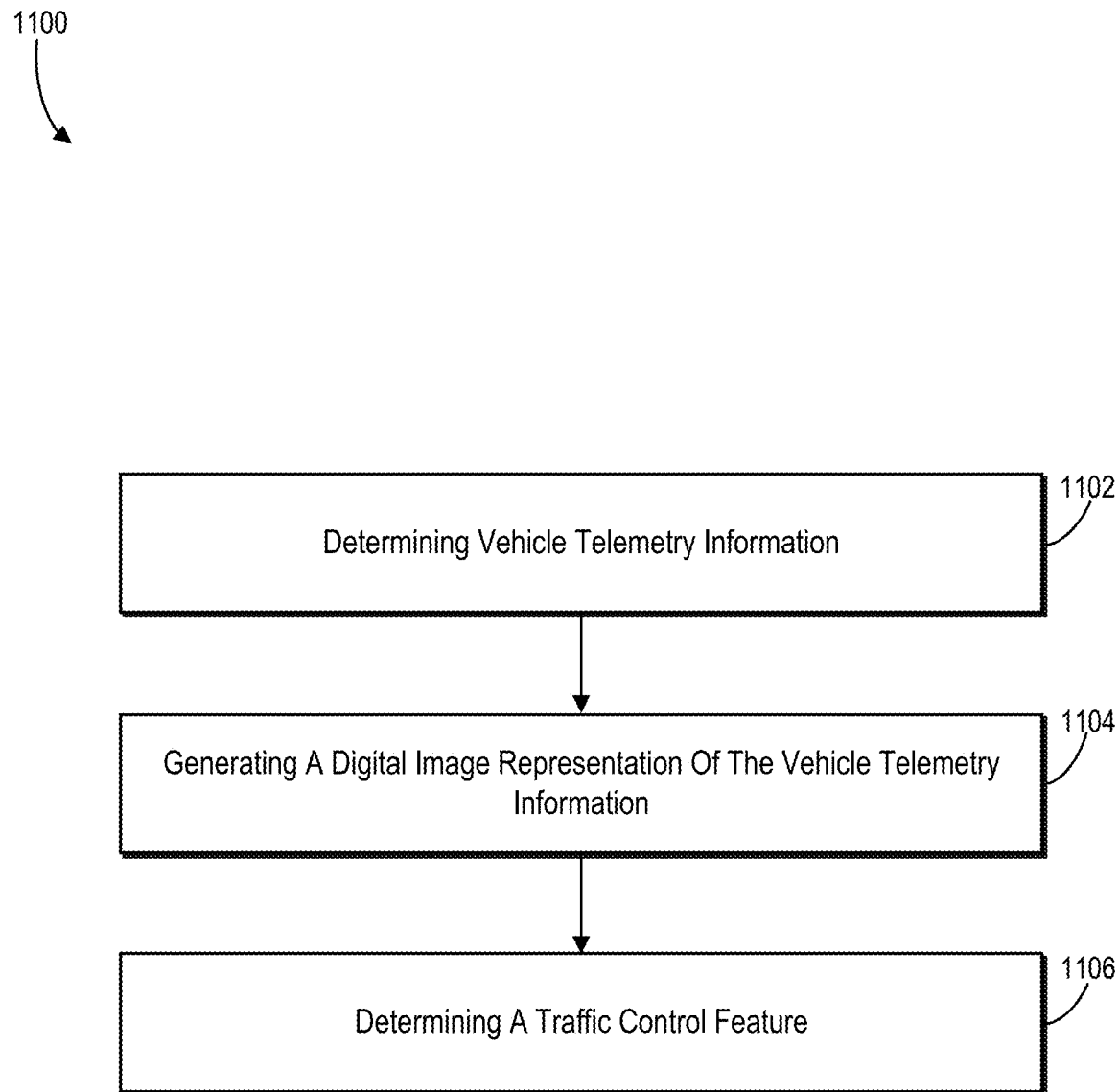
FIG. 11 illustrates a series of acts for determining a traffic control feature utilizing a convolutional neural network based on a digital image representation of vehicle telemetry information in accordance with one or more embodiments.

While FIG. 11 illustrates acts according to some embodiments, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 for determining traffic control features based on a digital image representation of vehicle telemetry information using a convolutional neural network. As shown, the series of acts 1100 includes an act 1102 of determining vehicle telemetry information. In particular, the act 1102 involves determining, for a traffic area, vehicle telemetry information relating to transportation vehicles associated with a transportation matching system. The act 1102 can further involve determining speeds and locations of the transportation vehicles within the traffic area. In some embodiments, a telemetry pattern of telemetry information reflects the speeds and the locations of the transportation vehicles.

In addition, the series of acts 1100 includes an act 1104 of generating a digital image representation of the vehicle telemetry information. In particular, the act 1104 involves generating a digital image representation of the vehicle telemetry information for the traffic area, wherein the digital image representation includes a telemetry pattern. For example, the act 1104 can involve determining frequencies of a plurality of speed-location combinations from the vehicle telemetry information relating to the transportation vehicles and generating the digital image based on the frequencies of the plurality of speed-location combinations. Generating the digital image based on the frequencies of the plurality of speed-location combinations can include generating a first pixel of the telemetry pattern based on a first frequency of a first speed-location combination and generating a second pixel of the telemetry pattern of the based on a second frequency of a second speed-location combination. A position of the first pixel within the digital image can reflect the first speed-location combination and a color of the first pixel is based on the first frequency.

In some embodiments, the act 1104 can involve determining frequencies of a plurality of speed-location combinations from the vehicle telemetry information relating to the transportation vehicles and generating the telemetry pattreen based on the frequencies of the plurality of speed-location combinations. Generating the telemetry pattern based on the frequencies of the plurality of speed-location combinations can include generating a first pixel of the telemetry pattern based on a first frequency of a first speed-location combination, wherein a position of the first pixel within the telemetry pattern reflects the first speed-location combination and a color of the first pixel is based on the first frequency and generating a second pixel of the telemetry pattern of the based on a second frequency of a second speed-location combination, wherein a position of the second pixel within the telemetry pattern reflects the second speed-location combination and a color of the second pixel is based on the second frequency.

As illustrated, the series of acts 1100 includes an act 1106 of determining a traffic control feature. In particular, the act 1106 involves determining a traffic control feature within the traffic area based on the telemetry pattern. The act 1106 can involve determining a traffic control feature within the traffic area based on the telemetry pattern by utilizing a deep learning architecture. In some embodiments, the deep learning architecture can include a convolutional neural network. The traffic control feature can include one or more of a traffic light, a traffic sign, a speed bump, or a crosswalk.

The series of acts 1100 can include an act of training the convolutional neural network to determine the traffic control feature. Training the convolutional neural network can include generating, utilizing the convolutional neural network, a predicted traffic control feature based on a training telemetry pattern of training vehicle telemetry information. Training the convolutional neural network can also include comparing the predicted traffic control feature with a ground truth traffic control feature associated with the training telemetry pattern to determine a measure of loss associated with the convolutional neural network and modifying one or more weights of the convolutional neural network based on the measure of loss.

In addition, the series of acts 1100 can include an act of identifying the training vehicle telemetry information based on speeds and locations of transportation vehicles within a training traffic area. Further, the series of acts 1100 can include an act of generating the training telemetry pattern for the training traffic area by generating a pixel of the telemetry pattern based on a frequency of transportation vehicles corresponding to a speed-location combination from the training vehicle telemetry information.

Further, the series of acts 1100 can include an act of determining a travel time for a transportation request associated with a route that passes through the traffic area by applying a time penalty based on a stop time associated with the traffic control feature.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
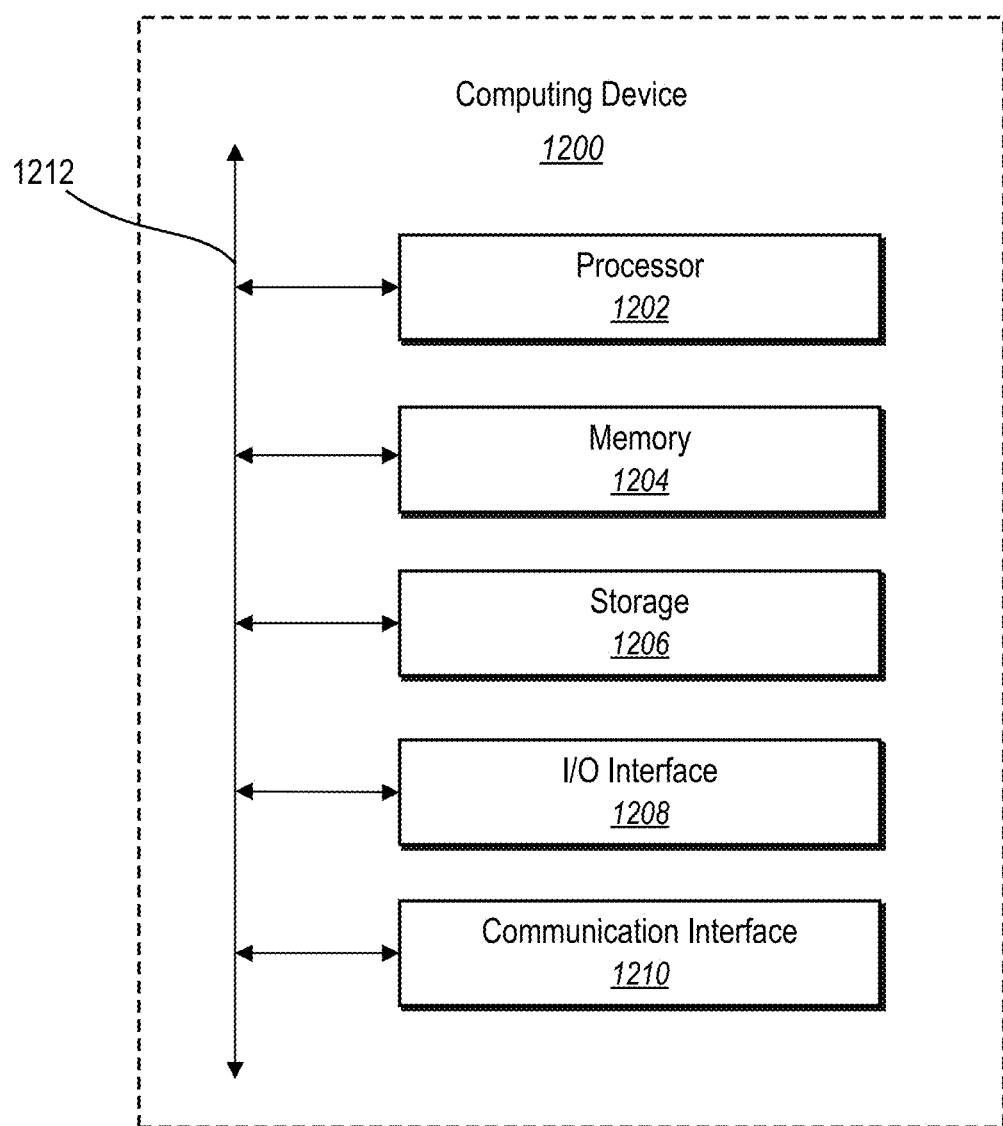
FIG. 12 illustrates a block diagram of a computing device for implementing one or more embodiments of the present disclosure.

FIG. 12 illustrates, in block diagram form, an exemplary computing device 1200 that may be configured to perform one or more of the processes described above. One will appreciate that the traffic control feature determination system 104 can comprise implementations of the computing device 1200, including, but not limited to, the transportation vehicle devices 108a-108n and/or the server(s) 106. As shown by FIG. 12, the computing device can comprise a processor 1202, memory 1204, a storage device 1206, an I/O interface 1208, and a communication interface 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive ("HDD"), flash memory, a Universal Serial Bus ("USB") drive or a combination of these or other storage devices.

The computing device 1200 also includes one or more input or output interface 1208 (or "I/O interface 1208"), which are provided to allow a user (e.g., requester or provider) to provide input to (such as user strokes), receive output from, and otherwise transfer data to and from the computing device 1200. These I/O interface 1208 may include a mouse, keypad or a keyboard, a touch screen, camera, optical scanner, network interface, modem, other known I/O devices or a combination of such I/O interface 1208. The touch screen may be activated with a stylus or a finger.

The I/O interface 1208 may include one or more devices for presenting output to a user, including, but not limited to, a graphics engine, a display (e.g., a display screen), one or more output providers (e.g., display providers), one or more audio speakers, and one or more audio providers. In certain embodiments, interface 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller ("NIC") or network adapter for communicating with an Ethernet or other wire-based network or a wireless NIC ("WNIC") or wireless adapter for communicating with a wireless network, such as a WI-FI. The computing device 1200 can further include a bus 1212. The bus 1212 can comprise hardware, software, or both that connects components of computing device 1200 to each other.

Figure 13:
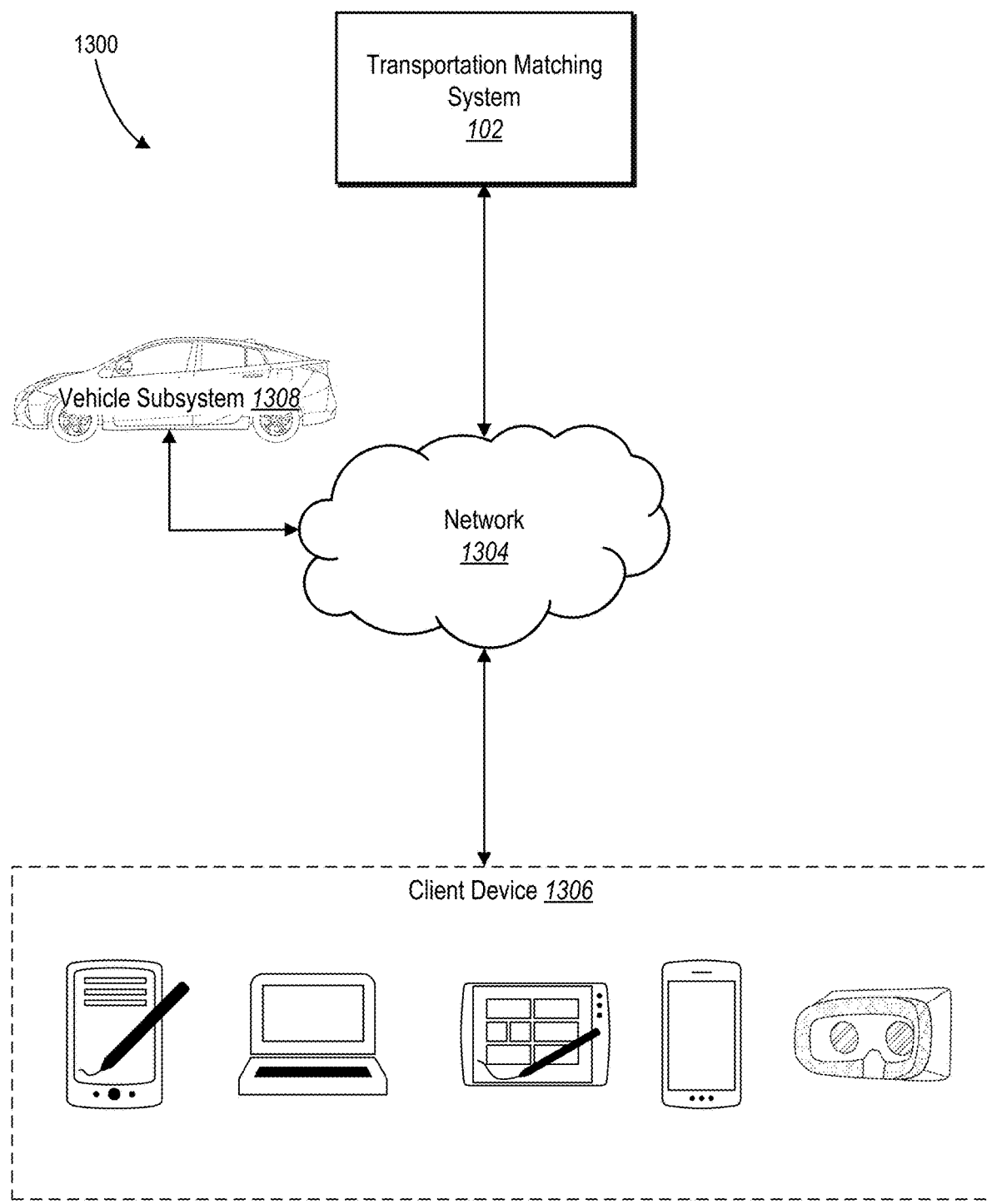
FIG. 13 illustrates an environment for a traffic control feature determination system in accordance with one or more embodiments.

FIG. 13 illustrates an example network environment 1300 of the transportation matching system 102. The network environment 1300 includes a client device 1306 (e.g., one or more of the transportation vehicle devices 108a-108n), a transportation matching system 102, and a vehicle subsystem 1308 connected to each other by a network 1304. Although FIG. 13 illustrates a particular arrangement of the client device 1306, the transportation matching system 102, the vehicle subsystem 1308, and the network 1304, this disclosure contemplates any suitable arrangement of client device 1306, the transportation matching system 102, the vehicle subsystem 1308, and the network 1304. As an example, and not by way of limitation, two or more of client device 1306, the transportation matching system 102, and the vehicle subsystem 1308 communicate directly, bypassing network 1304. As another example, two or more of client device 1306, the transportation matching system 102, and the vehicle subsystem 1308 may be physically or logically co-located with each other in whole or in part.

Moreover, although FIG. 13 illustrates a particular number of client devices 1306, transportation matching systems 102, vehicle subsystems 1308, and networks 1304, this disclosure contemplates any suitable number of client devices 1306, transportation matching system 102, vehicle subsystems 1308, and networks 1304. As an example, and not by way of limitation, network environment 1300 may include multiple client device 1306, transportation matching system 102, vehicle subsystems 1308, and/or networks 1304.

This disclosure contemplates any suitable network 1304. As an example, and not by way of limitation, one or more portions of network 1304 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1304 may include one or more networks 1304.

Links may connect client device 1306, traffic control feature determination system 104, and vehicle subsystem 1308 to network 1304 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1300. One or more first links may differ in one or more respects from one or more second links.

In particular embodiments, the client device 1306 may be an electronic device including hardware, software, or embedded logic components or a combination of two or more such components and capable of carrying out the appropriate functionalities implemented or supported by client device 1306. As an example, and not by way of limitation, a client device 1306 may include any of the computing devices discussed above in relation to FIG. 12. A client device 1306 may enable a network user at the client device 1306 to access network 1304. A client device 1306 may enable its user to communicate with other users at other client devices 1306.

In particular embodiments, the client device 1306 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1306 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1306 one or more Hyper Text Markup Language ("HTML") files responsive to the HTTP request. The client device 1306 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, transportation matching system 102 may be a network-addressable computing system that can host a transportation matching network. The transportation matching system 102 may generate, store, receive, and send data, such as, for example, user-profile data, concept-profile data, text data, transportation request data, GPS location data, provider data, requester data, vehicle data, or other suitable data related to the transportation matching network. This may include authenticating the identity of providers and/or vehicles who are authorized to provide transportation services through the transportation matching system 102. In addition, the transportation matching system 102 may manage identities of service requesters such as users/requesters. In particular, the transportation matching system 102 may maintain requester data such as driving/riding histories, personal data, or other user data in addition to navigation and/or traffic management services or other location services (e.g., GPS services).

In particular embodiments, the transportation matching system 102 may manage transportation matching services to connect a user/requester with a vehicle and/or provider. By managing the transportation matching services, the transportation matching system 102 can manage the distribution and allocation of resources from vehicle systems and user resources such as GPS location and availability indicators, as described herein.

The transportation matching system 102 may be accessed by the other components of network environment 1300 either directly or via network 1304. In particular embodiments, the transportation matching system 102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1306, or a transportation matching system 102 to manage, retrieve, modify, add, or delete, the information stored in data store.

In particular embodiments, the transportation matching system 102 may provide users with the ability to take actions on various types of items or objects, supported by the transportation matching system 102. As an example, and not by way of limitation, the items and objects may include transportation matching networks to which users of the transportation matching system 102 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 102 or by an external system of a third-party system, which is separate from transportation matching system 102 and coupled to the transportation matching system 102 via a network 1304.

In particular embodiments, the transportation matching system 102 may be capable of linking a variety of entities. As an example, and not by way of limitation, the transportation matching system 102 may enable users to interact with each other or other entities, or to allow users to interact with these entities through an application programming interfaces ("API") or other communication channels.

In particular embodiments, the transportation matching system 102 may include a variety of servers, sub-systems, programs, modules, logs, and data stores. In particular embodiments, the transportation matching system 102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile (e.g., provider profile or requester profile) store, connection store, third-party content store, or location store. The transportation matching system 102 may also include suitable components such as network interfaces, security mechanisms, load balancers, failover servers, management-and-network-operations consoles, other suitable components, or any suitable combination thereof. In particular embodiments, the transportation matching system 102 may include one or more user-profile stores for storing user profiles for transportation providers and/or transportation requesters. A user profile may include, for example, biographic information, demographic information, behavioral information, social information, or other types of descriptive information, such as interests, affinities, or location.

The web server may include a mail server or other messaging functionality for receiving and routing messages between the transportation matching system 102 and one or more client devices 1306. An action logger may be used to receive communications from a web server about a user's actions on or off the transportation matching system 102. In conjunction with the action log, a third-party-content-object log may be maintained of user exposures to third-party-content objects. A notification controller may provide information regarding content objects to a client device 1306. Information may be pushed to a client device 1306 as notifications, or information may be pulled from client device 1306 responsive to a request received from client device 1306. Authorization servers may be used to enforce one or more privacy settings of the users of the transportation matching system 102. A privacy setting of a user determines how particular information associated with a user can be shared. The authorization server may allow users to opt in to or opt out of having their actions logged by the transportation matching system 102 or shared with other systems, such as, for example, by setting appropriate privacy settings. The authorization servers may enforce privacy settings of a user in accordance with one or more privacy laws and/or regulations. For example, the authorization servers may require that the collection of user information (e.g., identification, location, preferences, etc.) comply with requirements of a particular jurisdiction such as the laws of a particular city, state, and/or country. Third-party-content-object stores may be used to store content objects received from third parties. Location stores may be used for storing location information received from client devices 1306 associated with users.

In addition, the vehicle subsystem 1308 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1308 can include an autonomous vehicle—i.e., a vehicle that does not require a human operator. In these embodiments, the vehicle subsystem 1308 can perform maneuvers, communicate, and otherwise function without the aid of a human provider, in accordance with available technology.

In particular embodiments, the vehicle subsystem 1308 may include one or more sensors incorporated therein or associated thereto. For example, sensor(s) can be mounted on the top of the vehicle subsystem 1308 or else can be located within the interior of the vehicle subsystem 1308. In certain embodiments, the sensor(s) can be located in multiple areas at once—i.e., split up throughout the vehicle subsystem 1308 so that different components of the sensor(s) can be placed in different locations in accordance with optimal operation of the sensor(s). In these embodiments, the sensor(s) can include a LIDAR sensor and an inertial measurement unit ("IMU") including one or more accelerometers, one or more gyroscopes, and one or more magnetometers. The sensor(s) can additionally or alternatively include a wireless IMU ("WIMU"), one or more cameras, one or more microphones, or other sensors or data input devices capable of receiving and/or recording information relating to navigating a route to pick up, transport, and/or drop off a requester.

In particular embodiments, the vehicle subsystem 1308 may include a communication device capable of communicating with the client device 1306 and/or the traffic control feature determination system 104. For example, the vehicle subsystem 1308 can include an on-board computing device communicatively linked to the network 1304 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:
1. A method comprising:
   determining, for a traffic area, vehicle telemetry information comprising speeds and locations relating to transportation vehicles;
   generating a telemetry digital image comprising pixels representing the telemetry information for the traffic area; and
   determining a traffic control feature associated with the traffic area by processing the pixels representing the telemetry information from the telemetry digital image utilizing a deep learning architecture.

2. The method of claim 1, wherein determining the vehicle telemetry information comprises determining the speeds and the locations of the transportation vehicles as the transportation vehicles pass through the traffic area.

3. The method of claim 1, further comprising:
identifying, from the vehicle telemetry information, a plurality of speed-location combinations indicating speeds of transportation vehicles at corresponding locations within the traffic area;
determining frequencies with which the plurality of speed-location combinations occur within the traffic area; and
generating the telemetry digital image to represent the frequencies of the plurality of speed-location combinations.

4. The method of claim 3, wherein generating the telemetry digital image further comprises:
generating a first pixel of the telemetry digital image based on a first frequency of a first speed-location combination; and
generating a second pixel of the telemetry digital image based on a second frequency of a second speed-location combination.

5. The method of claim 1, wherein determining the traffic control feature within the traffic area comprises utilizing a convolutional neural network to classify the telemetry digital image into a classification of traffic control features based on the pixels representing the telemetry information.

6. The method of claim 5, further comprising training the convolutional neural network to determine the traffic control feature by:
generating, utilizing the convolutional neural network, a predicted traffic control feature based on a training digital image representation of training vehicle telemetry information, wherein the training digital image representation includes a training telemetry pattern;
determining a measure of loss associated with the convolutional neural network by comparing the predicted traffic control feature with a ground truth traffic control feature associated with the training telemetry pattern; and
modifying one or more weights of the convolutional neural network to reduce the measure of loss.

7. The method of claim 1, wherein the determining the traffic control feature for the traffic area comprises:
identifying a pattern of the pixels representing the telemetry information; and
determining a traffic control feature corresponding to the pattern.

8. A non-transitory computer readable medium comprising instructions that, when executed by at least one processor, cause a computer device to:
determine, for a traffic area, vehicle telemetry information comprising speeds and locations relating to transportation vehicles;
generate a telemetry digital image comprising pixels representing the telemetry information for the traffic area; and
determine a traffic control feature associated with the traffic area by processing the pixels representing the telemetry information from the telemetry digital image utilizing a deep learning architecture.

9. The non-transitory computer readable medium of claim 8, further comprising instructions that, when executed by the at least one processor, cause the computer device to determine the vehicle telemetry information by determining the speeds and the locations of the transportation vehicles as the transportation vehicles pass through the traffic area.

10. The non-transitory computer readable medium of claim 8, further comprising instructions that, when executed by the at least one processor, cause the computer device to:
identify, from the vehicle telemetry information, a plurality of speed-location combinations indicating speeds of transportation vehicles at corresponding locations within the traffic area;
determine frequencies with which the plurality of speed-location combinations occur within the traffic area; and
generate the telemetry digital image to represent the frequencies of the plurality of speed-location combinations.

11. The non-transitory computer readable medium of claim 10, further comprising instructions that, when executed by the at least one processor, cause the computer device to generate the telemetry digital image by:
generating a first pixel of the telemetry digital image based on a first frequency of a first speed-location combination; and
generating a second pixel of the telemetry digital image based on a second frequency of a second speed-location combination.

12. The non-transitory computer readable medium of claim 8, further comprising instructions that, when executed by the at least one processor, cause the computer device to determine the traffic control feature within the traffic area by utilizing a convolutional neural network to classify the telemetry digital image into a classification of traffic control features based on the pixels representing the telemetry information.

13. The non-transitory computer readable medium of claim 12, further comprising instructions that, when executed by the at least one processor, cause the computer device to train the convolutional neural network to determine the traffic control feature by:
generating, utilizing the convolutional neural network, a predicted traffic control feature based on a training digital image representation of training vehicle telemetry information, wherein the training digital image representation includes a training telemetry pattern;
determining a measure of loss associated with the convolutional neural network by comparing the predicted traffic control feature with a ground truth traffic control feature associated with the training telemetry pattern; and
modifying one or more weights of the convolutional neural network to reduce the measure of loss.

14. The non-transitory computer readable medium of claim 8, further comprising instructions that, when executed by the at least one processor, cause the computer device to determine the traffic control feature for the traffic area by:
identifying a pattern of the pixels representing the telemetry information; and
determining a traffic control feature corresponding to the pattern.

15. A system comprising:
at least one processor; and
a non-transitory computer readable medium comprising instructions that, when executed by the at least one processor, cause the system to:
determine, for a traffic area, vehicle telemetry information comprising speeds and locations relating to transportation vehicles;

generate a telemetry digital image comprising pixels representing the telemetry information for the traffic area; and determine a traffic control feature associated with the traffic area by processing the pixels representing the telemetry information from the telemetry digital image utilizing a deep learning architecture.

16. The system of claim 15, further comprising instructions that, when executed by the at least one processor, cause the system to determine the vehicle telemetry information by determining the speeds and the locations of the transportation vehicles as the transportation vehicles pass through the traffic area.

17. The system of claim 15, further comprising instructions that, when executed by the at least one processor, cause the system to:

identify, from the vehicle telemetry information, a plurality of speed-location combinations indicating speeds of transportation vehicles at corresponding locations within the traffic area;

determine frequencies with which the plurality of speed-location combinations occur within the traffic area; and generate the telemetry digital image to represent the frequencies of the plurality of speed-location combinations.

18. The system of claim 17, further comprising instructions that, when executed by the at least one processor, cause the system to generate the telemetry digital image by:

generating a first pixel of the telemetry digital image based on a first frequency of a first speed-location combination; and generating a second pixel of the telemetry digital image based on a second frequency of a second speed-location combination.

19. The system of claim 15, further comprising instructions that, when executed by the at least one processor, cause the system to determine the traffic control feature within the traffic area by utilizing a convolutional neural network to classify the telemetry digital image into a classification of traffic control features based on the pixels representing the telemetry information.

20. The system of claim 19, further comprising instructions that, when executed by the at least one processor, cause the system to train the convolutional neural network to determine the traffic control feature by:

generating, utilizing the convolutional neural network, a predicted traffic control feature based on a training digital image representation of training vehicle telemetry information, wherein the training digital image representation includes a training telemetry pattern;

determining a measure of loss associated with the convolutional neural network by comparing the predicted traffic control feature with a ground truth traffic control feature associated with the training telemetry pattern; and modifying one or more weights of the convolutional neural network to reduce the measure of loss.

* * * * *